US012693907B2

(12) United States Patent
Zhang

(10) Patent No.: US 12,693,907 B2
(45) Date of Patent: Jul. 28, 2026

(54) SERVICE PROCESSING METHOD AND RELATED APPARATUS

(71) Applicant: Honor Device Co., Ltd., Shenzhen (CN)

(72) Inventor: Peng Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 624 days.

(21) Appl. No.: 18/034,298

(22) PCT Filed: Sep. 9, 2022

(86) PCT No.: PCT/CN2022/118138
§ 371 (c)(1),
(2) Date: Apr. 27, 2023

(87) PCT Pub. No.: WO2023/109211
PCT Pub. Date: Jun. 22, 2023

(65) Prior Publication Data
US 2024/0338255 A1 Oct. 10, 2024

(30) Foreign Application Priority Data
Dec. 14, 2021 (CN) .......................... 202111526326.4

(51) Int. Cl.
*G06F 9/50* (2006.01)
*G06F 9/455* (2018.01)
(Continued)

(52) U.S. Cl.
CPC ........ *G06F 9/5077* (2013.01); *G06F 9/45558* (2013.01); *G06F 9/4881* (2013.01);
(Continued)

(58) Field of Classification Search
None
See application file for complete search history.

(56) References Cited

U.S. PATENT DOCUMENTS 6,199,181 B1 3/2001 Reshef et al.
11,379,573 B2 7/2022 Li et al.
(Continued)

FOREIGN PATENT DOCUMENTS

CN 103777995 A 5/2014
CN 106547618 A 3/2017
(Continued)

OTHER PUBLICATIONS

English Translation of CN 106547618.*
(Continued)

*Primary Examiner* — Qing Yuan Wu
(74) *Attorney, Agent, or Firm* — Conley Rose, P.C.

(57) ABSTRACT

A service processing method and a related apparatus, in which a mapping is established between a physical processor core used by a client application and a virtual processor core used by a trust application corresponding to the client application, so that the trust application can use time slice resources of the physical processor core occupied by the client application to the trust application to execute service processing. In this way, the system can perceive the time slice resources used by the trust application when scheduling resources of the physical processor core, which facilitates (Continued)

A REE OS receives a first operation for starting a first CA — 501

The REE OS allocates first time slice resources of a first physical processor core to the first CA in response to the first operation — 502

The first CA starts and occupies the first time slice resources, and generates a first service processing request for calling a first TA to execute service processing — 503

The first CA sends the first service processing request to a virtual machine manager through a first communication channel — 504

The virtual machine manager receives the first service processing request sent by the first CA, and maps and schedules, to the first physical processor core, a first virtual processor core in a second virtual machine corresponding to the first communication channel — 505

The virtual machine manager sends the first service processing request to a first TEE OS — 506

The first TEE OS starts on the first virtual processor core according to the first service processing request, and binds the first TA corresponding to the first CA with the first virtual processor core — 507

The first CA yields second time slice resources in the first time slice resources to the first TA through the virtual machine manager, where the second time slice resources are currently remaining time slice resources in the first time slice resources — 508

The first TA executes, by using some or all of the second time slice resources yielded by the first CA, a first service requested in the first service processing request — 509 implementing more accurate statistics on the usage of the resources of the physical processor core, thereby implementing load balancing during resource scheduling.

20 Claims, 13 Drawing Sheets

(51) Int. Cl.
    *G06F 9/48*           (2006.01)
    *G06F 21/53*         (2013.01)

(52) U.S. Cl.
    CPC ............ *G06F 9/5022* (2013.01); *G06F 21/53* (2013.01); *G06F 2009/4557* (2013.01); *G06F 9/5083* (2013.01)

(56)         References Cited

U.S. PATENT DOCUMENTS

| | | | |
|---|---|---|---|
| 2003/0229900 A1 | 12/2003 | Reisman | |
| 2020/0143041 A1* | 5/2020 | Jung | ...................... G06F 21/71 |
| 2021/0064740 A1 | 3/2021 | Hanel et al. | |

FOREIGN PATENT DOCUMENTS

| | | |
|---|---|---|
| CN | 106547633 A | 3/2017 |
| CN | 106548077 A | 3/2017 |
| CN | 106845285 A | 6/2017 |
| CN | 108509251 A | 9/2018 |
| CN | 109522754 A | 3/2019 |
| CN | 109739612 A | 5/2019 |
| CN | 110366843 A | 10/2019 |
| CN | 111859457 A | 10/2020 |
| CN | 115016886 A | 9/2022 |
| CN | 115017497 A | 9/2022 |

OTHER PUBLICATIONS

English translation of CN 115017497.*

Anonymous, "Core-OP-TEE documentation documentation," Retrieved from the internet: URL:https://optee.readthedocs.io/en/latest/architecture/core.html, Sep. 24, 2019, 37 Pages.

* cited by examiner

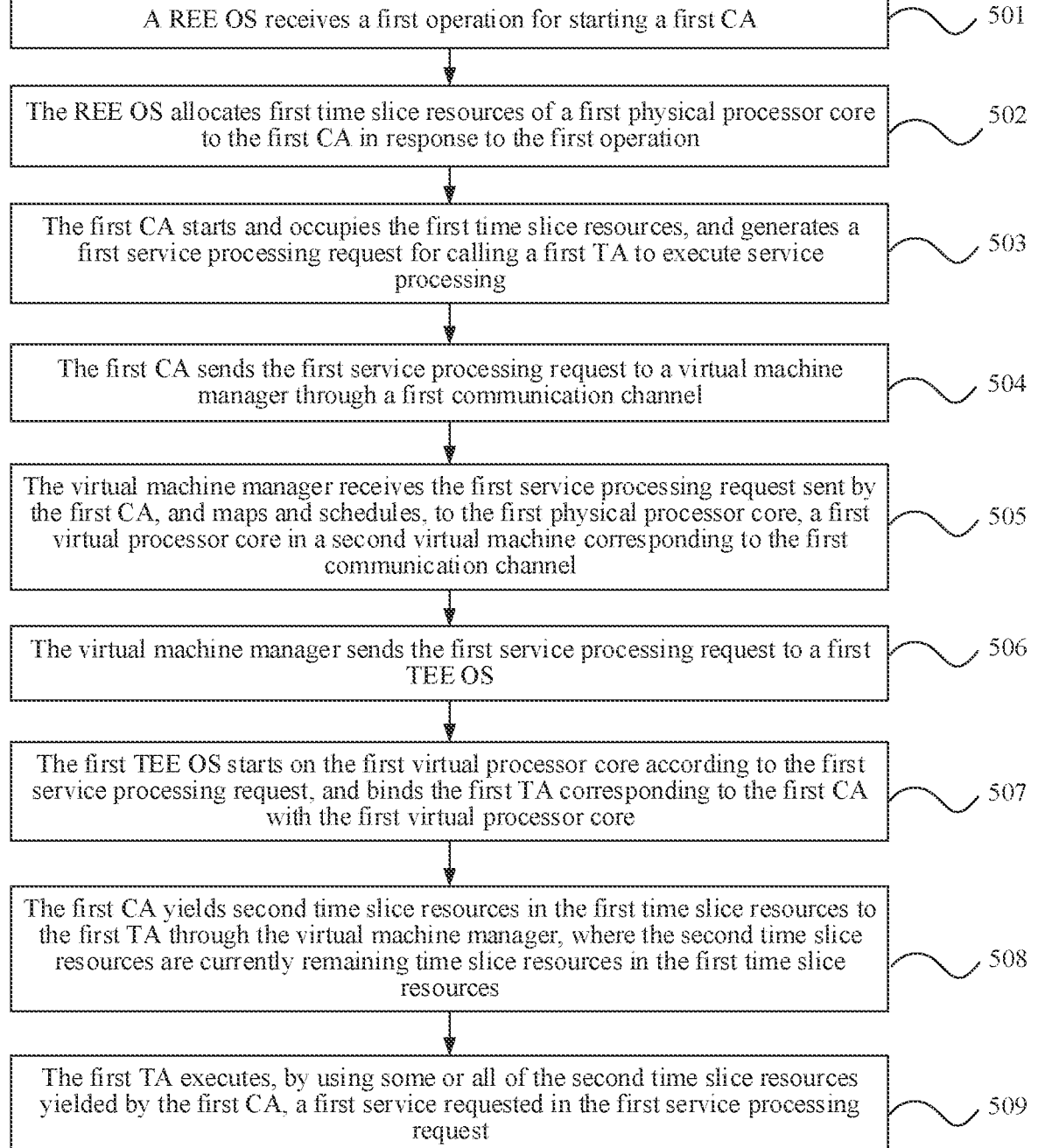

A REE OS receives a first operation for starting a first CA — 501

The REE OS allocates first time slice resources of a first physical processor core to the first CA in response to the first operation — 502

The first CA starts and occupies the first time slice resources, and generates a first service processing request for calling a first TA to execute service processing — 503

The first CA sends the first service processing request to a virtual machine manager through a first communication channel — 504

The virtual machine manager receives the first service processing request sent by the first CA, and maps and schedules, to the first physical processor core, a first virtual processor core in a second virtual machine corresponding to the first communication channel — 505

The virtual machine manager sends the first service processing request to a first TEE OS — 506

The first TEE OS starts on the first virtual processor core according to the first service processing request, and binds the first TA corresponding to the first CA with the first virtual processor core — 507

The first CA yields second time slice resources in the first time slice resources to the first TA through the virtual machine manager, where the second time slice resources are currently remaining time slice resources in the first time slice resources — 508

The first TA executes, by using some or all of the second time slice resources yielded by the first CA, a first service requested in the first service processing request — 509

FIG. 5

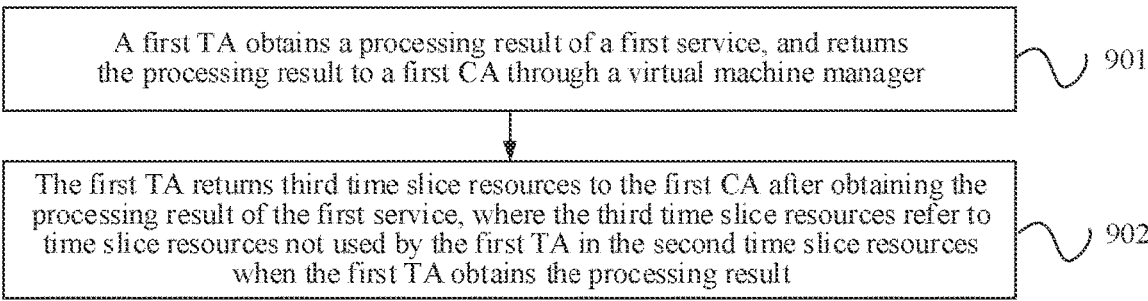

A first TA obtains a processing result of a first service, and returns the processing result to a first CA through a virtual machine manager ~ 901

The first TA returns third time slice resources to the first CA after obtaining the processing result of the first service, where the third time slice resources refer to time slice resources not used by the first TA in the second time slice resources when the first TA obtains the processing result ~ 902

FIG. 9

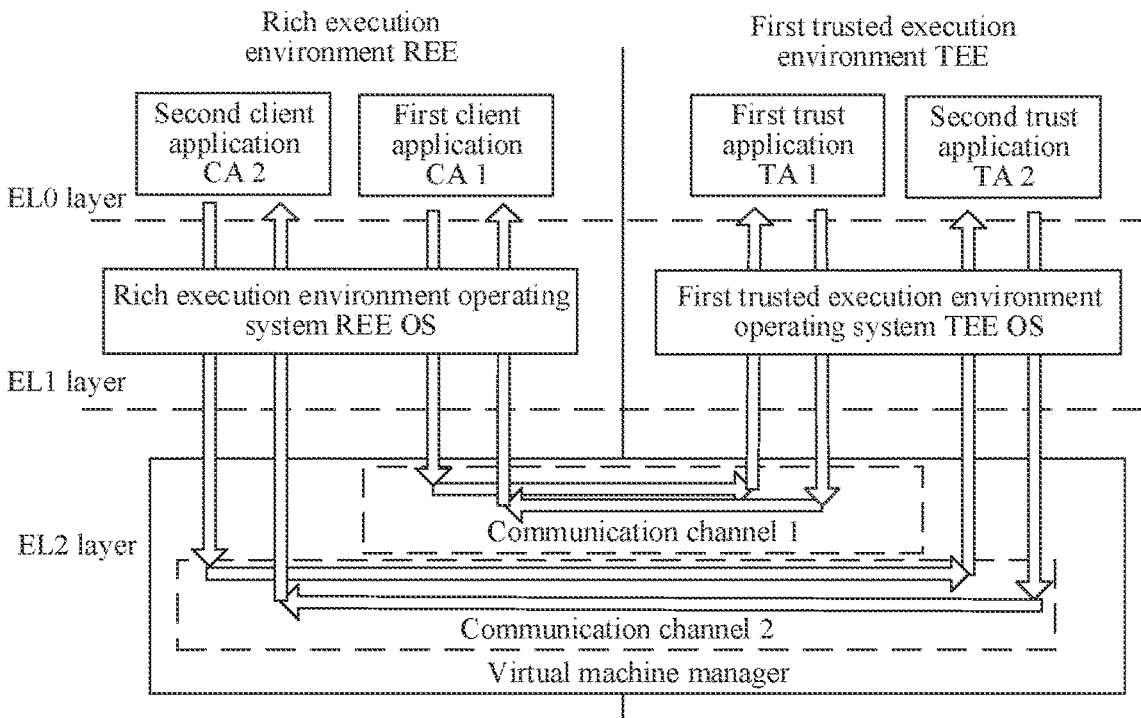

FIG. 10

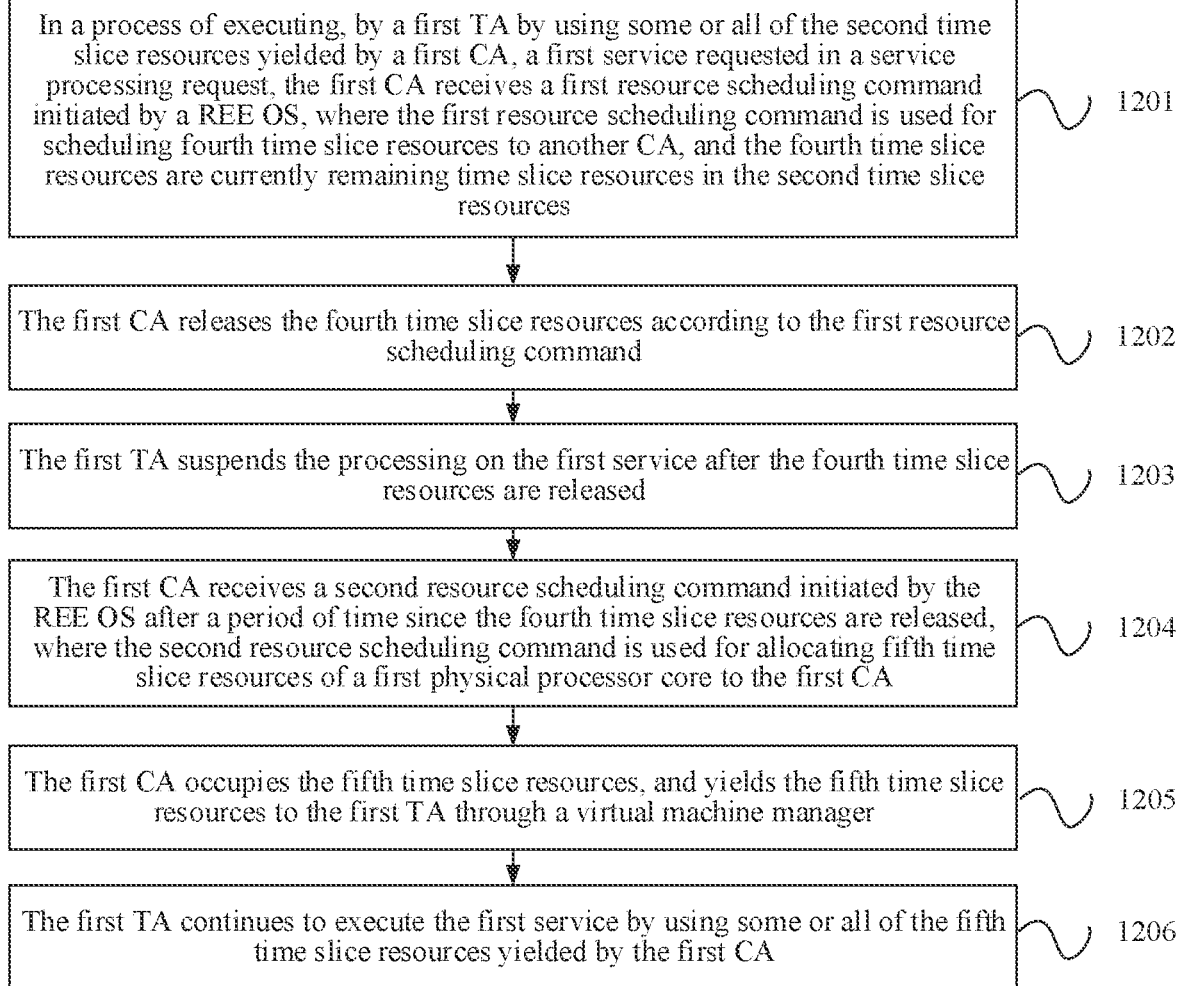

In a process of executing, by a first TA by using some or all of the second time slice resources yielded by a first CA, a first service requested in a service processing request, the first CA receives a first resource scheduling command initiated by a REE OS, where the first resource scheduling command is used for scheduling fourth time slice resources to another CA, and the fourth time slice resources are currently remaining time slice resources in the second time slice resources ⟶ 1201

The first CA releases the fourth time slice resources according to the first resource scheduling command ⟶ 1202

The first TA suspends the processing on the first service after the fourth time slice resources are released ⟶ 1203

The first CA receives a second resource scheduling command initiated by the REE OS after a period of time since the fourth time slice resources are released, where the second resource scheduling command is used for allocating fifth time slice resources of a first physical processor core to the first CA ⟶ 1204

The first CA occupies the fifth time slice resources, and yields the fifth time slice resources to the first TA through a virtual machine manager ⟶ 1205

The first TA continues to execute the first service by using some or all of the fifth time slice resources yielded by the first CA ⟶ 1206

FIG. 12

SERVICE PROCESSING METHOD AND RELATED APPARATUS

CROSS-REFERENCE TO RELATED APPLICATIONS

This application is a U.S. National Stage of International Application No. PCT/CN2022/118138 filed on Sep. 9, 2022, which claims priority to Chinese Patent application Ser. No. 202111526326.4, filed with China National Intellectual Property Administration on Dec. 14, 2021, both of which are incorporated herein by reference in their entireties.

TECHNICAL FIELD

This application relates to the field of computer safety technologies, and in particular, to a service processing method and a related apparatus.

BACKGROUND

At present, with the continuous development of communication technologies, intelligent terminals are more widely applied. To protect user privacy and information safety, an intelligent terminal device (such as a mobile phone or a tablet computer) usually includes a rich execution environment (rich execution environment, REE) and a trusted execution environment (trusted execution environment, TEE). The REE is also referred to as an ordinary execution environment, including a rich execution environment operating system (rich execution environment operating system, REE OS) and a client application (client application, CA) which are run on a general processor. The TEE is also referred to as a secure execution environment, which can run a trusted execution environment operating system (trusted execution environment operating system, TEE OS) and provide the CA with reliable secure services (such as a fingerprint comparison service, a password verification service and a face comparison service). These secure services may be run on the TEE OS in a form of trust application (trust application, TA).

SUMMARY

Embodiments of this application provide a service processing method and a related apparatus, to improve the effectiveness of processor resource scheduling.

According to a first aspect, this application provides a service processing method, applicable to a terminal device including a first virtual machine, a second virtual machine, and a virtual machine manager Hypervisor, where the first virtual machine includes at least one physical processor core, a rich execution environment REE is run in the first virtual machine, a first trusted execution environment TEE is run in the second virtual machine, a rich execution environment operating system REE OS and a plurality of client applications CAs are run in the rich execution environment REE, and a first TEE OS and a plurality of trust applications TAs are run in the first TEE; where the plurality of CAs include a first CA; the plurality of TAs include a first TA corresponding to the first CA; the virtual machine manager Hypervisor includes at least one communication channel, where each communication channel corresponds to one virtual processor core in the second virtual machine; and the at least one communication channel includes a first communication channel:

the method including: receiving, by the REE OS, a first operation for starting the first CA; allocating, by the REE OS, first time slice resources of a first physical processor core to the first CA in response to the first operation; occupying, by the first CA after starting, the first time slice resources, and generating, by the first CA, a first service processing request for calling the first TA to execute service processing; sending, by the first CA, the first service processing request to the virtual machine manager Hypervisor through the first communication channel; receiving, by the virtual machine manager Hypervisor, the first service processing request sent by the first CA, and mapping and scheduling, to the first physical processor core, a first virtual processor core in the second virtual machine corresponding to the first communication channel; sending, by the virtual machine manager Hypervisor, the first service processing request to the first TEE OS; binding, by the first TEE OS, after starting on the first virtual processor core according to the first service processing request, the first TA corresponding to the first CA with the first virtual processor core (which is equivalent to that the first TEE OS schedules the first TA to run on the first virtual processor core); yielding, by the first CA, second time slice resources in the first time slice resources to the first TA through the virtual machine manager Hypervisor (which is equivalent to that the virtual machine manager Hypervisor allocates a second time slice resources of the first CA to the TA of the first TEE for running), where the second time slice resources are currently remaining time slice resources in the first time slice resources; and executing, by the first TA by using some or all of the second time slice resources yielded by the first CA, a first service requested in the first service processing request.

The physical processor core and the virtual processor core are relative concepts. The physical processor core can be understood as a core of a physical CPU, and the virtual processor core can be understood as a core of a virtual CPU virtualized by virtualization technology.

In this way, by establishing a mapping between the physical processor core used by the client application and the virtual processor core used by the trust application corresponding to the client application, the time slice resources of the physical processor core occupied by the client application can be yielded to the trust application to execute service processing, so that the system can perceive the time slice resources used by the trust application when scheduling the resources of the physical processor core, which facilitates more accurate statistics on the usage of the resources of the physical processor core, thereby implementing load balance during resource scheduling.

In an implementation, an execution status of the first CA is a working state when the first TA uses the time slice resources yielded by the first CA; and the method further includes: collecting, by the REE OS, statistics on an execution status of each CA in the REE, to determine a current resource load condition of each physical processor core of the terminal device.

In this way, in a period when the client application yields the time slice resources, the client application maintains the working state. Therefore, when the rich execution environment operating system collects statistics on the execution status of each client application in the rich execution environment, the time slice resources yielded by the client application can also be counted by the rich execution environment operating system, which facilitates load balance when the rich execution environment operating system performs resource scheduling for each application in the rich execution environment.

In an implementation, the virtual machine manager Hypervisor includes at least two communication channels, and each communication channel corresponds to one virtual processor core, where different communication channels in the virtual machine manager Hypervisor are configured to receive service processing requests sent by different CAs in the plurality of CAs; and the virtual machine manager Hypervisor maps and schedules the virtual processor core corresponding to each communication channel to a physical processor core occupied by the corresponding CA.

In this way, service processing requests from the plurality of client applications can be synchronously or asynchronously received through different communication channels in the virtual machine manager Hypervisor, and virtual processor cores corresponding to the different communication channels are mapped and scheduled to physical processor cores occupied by the client applications corresponding to the service processing requests received by the communication channels, thereby realizing concurrent service processing of multiple client applications based on a mapping mechanism.

In an implementation, a quantity of the virtual processor cores included in the virtual machine manager Hypervisor is less than or equal to a total quantity of the physical processor cores in the terminal device.

In this way, by limiting the quantity of the virtual processor cores, on the one hand, a concurrent quantity of virtual machine trusted services carried by the physical processor cores on the terminal device can be effectively reduced, to indirectly improve the processing efficiency of a current service. On the other hand, a limited quantity of virtual processor cores can be dynamically mapped (in dynamic mapping, it can be considered that the mapping relationship is dynamic, where the mapping relationship is established when there is a demand, and can be released after the demand is completed) to the physical processor cores, and there is no need to establish a fixed mapping relationship (in the fixed mapping relationship, it can be considered that the mapping relationship always exists remains unchanged regardless of whether there is a demand or not) between each physical processor core and one virtual processor core, thereby saving system resources and improving the flexibility of mapping.

In an implementation, the method further includes: obtaining, by the first TA, a processing result of the first service, and returning the processing result to the first CA through the virtual machine manager Hypervisor; and returning, by the first TA, third time slice resources to the first CA after obtaining the processing result of the first service, where the third time slice resources refer to time slice resources not used by the first TA in the second time slice resources when the first TA obtains the processing result, where the returning, by the first TA, third time slice resources to the first CA includes: sending, by the first TEE OS, a first request to the virtual machine manager Hypervisor after the TA obtains the processing result of the service processing request, where the first request is used for instructing the virtual machine manager Hypervisor to release the mapping between the first virtual processor core and the first physical processor core; and releasing, by the virtual machine manager Hypervisor, the mapping between the first virtual processor core and the first physical processor core according to the first request.

In this way, there is a mapping relationship between the virtual processor core and the physical processor core, and the trust application always uses the time slice resources yielded by the client application to execute services. Therefore, after the trust application finishes service processing, the remaining time slice resources can be returned to the client application, and the virtual machine manager may release the mapping between the virtual processor core and the physical processor core.

In an implementation, the method further includes: receiving, by the first CA, a first resource scheduling command initiated by the REE OS in the process of executing, by the first TA by using some or all of the second time slice resources yielded by the first CA, a first service requested in the service processing request, where the first resource scheduling command is used for scheduling fourth time slice resources to another CA, and the fourth time slice resources are currently remaining time slice resources in the second time slice resources; releasing, by the first CA, the fourth time slice resources according to the first resource scheduling command; and suspending, by the first TA, the processing on the first service after the fourth time slice resources are released.

In this way, there is a mapping relationship between the virtual processor core and the physical processor core, and the trust application always uses the time slice resources yielded by the client application to execute services. Therefore, when a service with a higher priority needs to be processed in the rich execution environment operating system, the rich execution operating system can recover the time slice resources occupied by the client application on the physical processor core, so that the trust application on the virtual processor core no longer uses the time slice resources yielded by the client application and suspends the service processing.

In an implementation, the method further includes: receiving, by the first CA, a second resource scheduling command initiated by the REE OS after a period of time since the fourth time slice resources are released, where the second resource scheduling command is used for allocating fifth time slice resources of the first physical processor core to the first CA; occupying, by the first CA, the fifth time slice resources, and yielding the fifth time slice resources to the first TA through the virtual machine manager Hypervisor; and continuing to execute, by the first TA, the first service by using some or all of the fifth time slice resources yielded by the first CA.

In this way, in a period when the trust application suspends service execution, the mapping relationship between the virtual processor core and the physical processor core always exists. Therefore, when the client application regains the time slice resources allocated by the rich execution environment operating system, the time slice resources can continue to be yielded to the trust application, and the trust application may continue to use the time slice resources to execute the service.

In an implementation, the execution status of the first CA is a working state when the first TA uses the second time slice resources yielded by the first CA; and the execution status of the first CA is an idle state after the first CA releases the fourth time slice resources.

In this way, by keeping the client application in a working state a period when the time slice resources are yielded and making the client application in an idle state in a period when the time slice resources are released, when the rich execution environment operating system collects statistics on the execution status of each client application in the rich execution environment, the time slice resources yielded by the client application can also be counted by the rich execution environment operating system, which facilitates load balance when the rich execution environment operating system performs resource scheduling for each application in the rich execution environment.

In an implementation, the plurality of CAs further include a second CA; the plurality of TAs further include a second TA corresponding to the second CA; and the at least one communication channel includes a second communication channel; and the method further includes: receiving, by the REE OS, a second operation for starting the second CA; allocating, by the REE OS, sixth time slice resources of a second physical processor core to the second CA in response to the second operation; occupying, by the second CA after starting, the sixth time slice resources, and generating, by the second CA, a second service processing request for calling the second TA to execute service processing; sending, by the second CA, the second service processing request to the virtual machine manager Hypervisor through the second communication channel; receiving, by the virtual machine manager Hypervisor, the second service processing request sent by the second CA, and mapping and scheduling, to the second physical processor core, a second virtual processor core in the second virtual machine corresponding to the second communication channel; sending, by the virtual machine manager Hypervisor, the second service processing request to the first TEE OS; binding, by the first TEE OS after starting on the second virtual processor core according to the second service processing request, the second TA corresponding to the second CA with the second virtual processor core; yielding, by the second CA, seventh time slice resources in the sixth time slice resources to the second TA through the virtual machine manager Hypervisor, where the seventh time slice resources are currently remaining time slice resources in the sixth time slice resources; and executing, by the second TA by using some or all of the seventh time slice resources yielded by the second CA, a second service requested in the second service processing request.

In this way, the rich execution environment may include a plurality of client applications. Different client applications can transmit service processing requests to the first trusted execution environment through different communication channels, to call trust applications corresponding to the client applications to execute service processing, thereby implementing concurrent service processing of multiple client applications based on a mapping mechanism.

In an implementation, the terminal device further includes a trust zone Trust Zone and a secure monitor Secure Monitor, where a second trusted execution environment TEE is run in the trust zone Trust Zone, and a plurality of trust applications TAs including a third TA are run in the second TEE.

In an implementation, the plurality of CAs further include a third CA, and the third CA corresponds to the third TA; the method further includes: receiving, by the REE OS, a third operation for starting the third CA; generating, by the third CA after starting, a third service processing request for calling the third TA to execute service processing; sending, by the third CA, the third service processing request to the third TA in the second TEE through the security monitor Secure Monitor; processing, by the third TA, a third service requested in the third service processing request to obtain a processing result; and returning, by the third TA, the processing result of the third service to the third CA through the security monitor Secure Monitor.

In this way, under the framework of the trusted execution environment based on the virtual machine mechanism, the framework can also be combined with the trusted execution environment based on the trust zone, so that the client application can call, based on actual needs, trusted execution environments under different frameworks to execute services.

According to a second aspect, an embodiment of this application provides a terminal device. The terminal device may also be referred to as a terminal (terminal), user equipment (user equipment, UE), a mobile station (mobile station, MS), a mobile terminal (mobile terminal, MT), or the like. The terminal device may be a mobile phone (mobile phone), a smart TV, a wearable device, a tablet computer (Pad), a computer with a wireless transceiver function, a virtual reality (virtual reality, VR) terminal device, an augmented reality (augmented reality, AR) terminal device, a wireless terminal in industrial control (industrial control), a wireless terminal in self-driving (self-driving), a wireless terminal in remote surgery (remote medical surgery), a wireless terminal in a smart grid (smart grid), a wireless terminal in transportation safety (transportation safety), a wireless terminal in a smart city (smart city), a wireless terminal in a smart home (smart home), and the like.

The terminal device includes a processor, and the processor is configured to call a computer program in a memory to perform the method according to the first aspect.

According to a third aspect, an embodiment of this application provides a computer-readable storage medium. The computer-readable storage medium stores computer instructions, and the computer instructions, when run on a terminal device, cause the terminal device to perform the method according to the first aspect.

According to a fourth aspect, an embodiment of this application provides a chip. The chip includes a processor, and the processor is configured to call a computer program in a memory to perform the method according to the first aspect.

It should be understood that the second aspect to the fourth aspect of this application correspond to the technical solution of the first aspect of this application, and the beneficial effects obtained by each aspect and the corresponding feasible implementations are similar. Details are not described herein again.

BRIEF DESCRIPTION OF DRAWINGS

FIG. 5 is a schematic flowchart of a service processing method according to an embodiment of this application:

FIG. 9 is a schematic flowchart of another service processing method according to an embodiment of this application;

FIG. 10 is a schematic diagram of communication channels of another virtual machine manager according to an embodiment of this application;

FIG. 12 is a schematic flowchart of further another service processing method according to an embodiment of this application:

DESCRIPTION OF EMBODIMENTS

Figure 1:
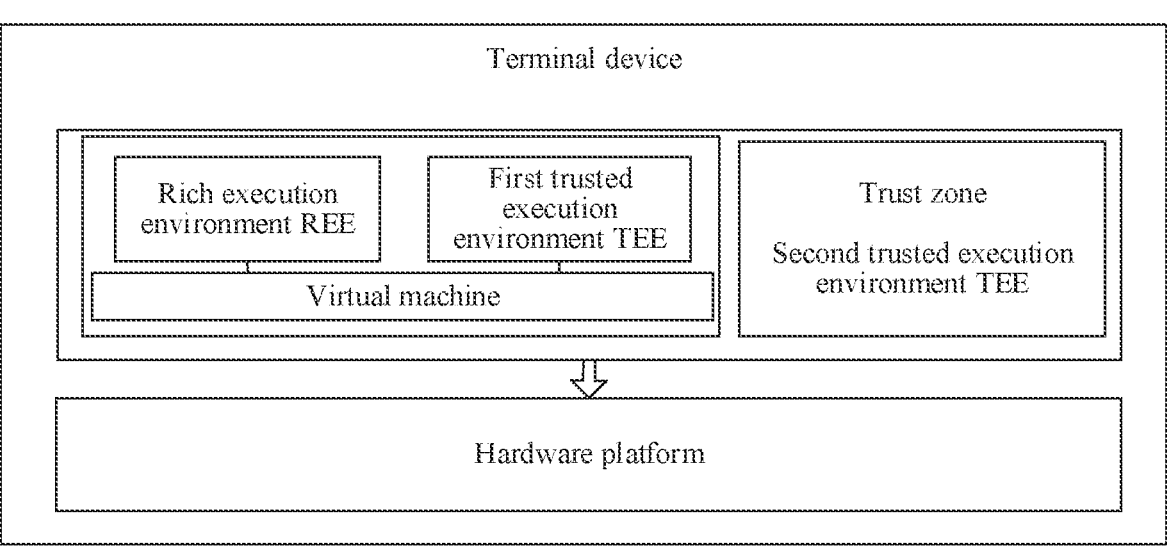
FIG. 1 is a schematic diagram of a framework of a terminal device according to an embodiment of this application.

With the development of mobile technologies, a terminal device has higher requirements on the security of a service operating environment when processing a service. A trusted execution environment TEE is an execution area constructed by using a secure area of a processor in the terminal device. The trusted execution environment can provide a secure operating environment for a service process.

In an implementation, advanced RISC machines (Advanced RISC Machines, ARM) integrate the Trust Zone technology with the Coretex-A processor. By establishing the trusted execution environment TEE in a trust zone (Trust Zone), the confidentiality and integrity of the code and data loaded in the trusted execution environment TEE can be protected. In another implementation, different from the trusted execution environment implemented based on the Trust Zone technology, virtualization is a technology for running a plurality of operating systems on a same terminal device. By establishing the trusted execution environment TEE on a virtual machine, the trusted execution environment can provide a secure service operating environment for service execution.

Generally, both the scheduling of processor resources in the terminal device and the realization of resource load balance are performed by an operating system of the terminal device. When the trusted execution environment TEE is implemented based on virtual machine technologies, both a rich execution environment REE and the trusted execution environment TEE are execution environments virtualized based on a virtual machine manager Hypervisor. That is, two systems may run on the terminal device, and the rich execution environment operating system REE OS is a main operating system.

The rich execution environment operating system REE OS and a trusted execution environment operating system TEE OS are in an equal relationship, that is, although there is no association between the two operating systems, environment applications of the two systems share same processor resources of the terminal device. When the rich execution environment operating system REE OS acts as a main operating system to perform scheduling and load balance on the processor resources on the current terminal device, it cannot perceive the consumption of the processor resources due to the running of trust applications in the trusted execution environment TEE. This also makes the rich execution environment operating system REE OS unable to perform reasonable load balance scheduling. Some embodiments of this application can enable the rich execution operating environment operating system REE OS to perceive services in the trusted execution environment TEE, so that the services in the trusted execution environment TEE can be included in the load balance scheduling to realize the load balance of the whole system.

For better understanding of the embodiments of this application, the following describes technical frameworks involved in the embodiments of this application.

The trust zone (Trust Zone) technology is a secure extension technology based on a processor architecture, which can provide a real hardware-supported secure environment for client applications. However, with the development of services and the increase in the complexity of service operations, the conventional technology of implementing a trusted execution environment based on the trust zone (Trust Zone) technology cannot provide sufficient computing resources and computing power for complex services. In this background, a framework of virtualized trusted execution environment emerges.

The virtualization technology is a technology for running a plurality of operating systems on a same terminal device at the same time. The virtualization technology can realize the construction of a trusted execution environment. The virtualization technology can be realized based on ARM (Advanced RISC Machines), and Virtualization Extension technology (Virtualization Extension technology) introduced by the ARM can realize hardware virtualization based on an ARM platform, to achieve hardware isolation for different operating environments in a normal operating environment.

It should be noted that the ARMv8 begins to support four ELs (exception levels, Exception Level) from EL0 to EL3, and a larger the number after the exception level indicates a higher security level. Generally speaking, an application is run at the EL0 layer, a system kernel (referred to as an operating system in some embodiments) is run at the EL1 layer, a hypervisor (a virtual machine manager) is run at the EL2 layer, and the Secure Monitor (secure monitor) is run at the EL3 layer. The development of these technologies makes a virtual machine-based TEE environment possible, thereby implementing secure scenarios with higher complexity.

In an example, by combining the trust zone Trust Zone technology and the virtualization technology, arrangement requirements of arranging a plurality of trusted execution environments in the terminal device can be satisfied.

FIG. 1 is a schematic diagram of a framework of a terminal device according to an embodiment of this application. As shown in FIG. 1, the framework uses the trust zone Trust Zone technology and the virtualization technology to construct a plurality of trusted execution environments.

The framework includes operating environments independent of each other: a rich execution environment REE, a first trusted execution environment TEE, and a second trusted execution environment TEE. Client applications CAs are run in the REE, and trust applications TAs are run in the first trusted execution environment TEE and the second trusted execution environment TEE. The client application CA can call the TA in the first TEE to execute a service request through a virtual machine manager Hypervisor; and the client application CA can call the TA in the second TEE to execute the service request through a secure monitor Secure Monitor.

It can be learnt that the rich execution environment operating system REE OS in the rich execution environment REE mentioned in this application may be specifically an Android system, an IOS system, or other operating systems, which is not limited in this application.

For example, the CAs run in the REE include a first CA, a second CA (not shown in the figure), and a third client application CA; a first TA corresponding to the first CA and a second TA (not shown in the figure) corresponding to the second CA are run in the first TEE, and a third TA corresponding to the third CA is run in the second TEE. The first CA can call the first TA to execute a service request and the second CA can call the second TA to execute a service request through the virtual machine manager Hypervisor. The third CA can call the third TA to execute a service request through the secure monitor Secure Monitor.

Figure 2:
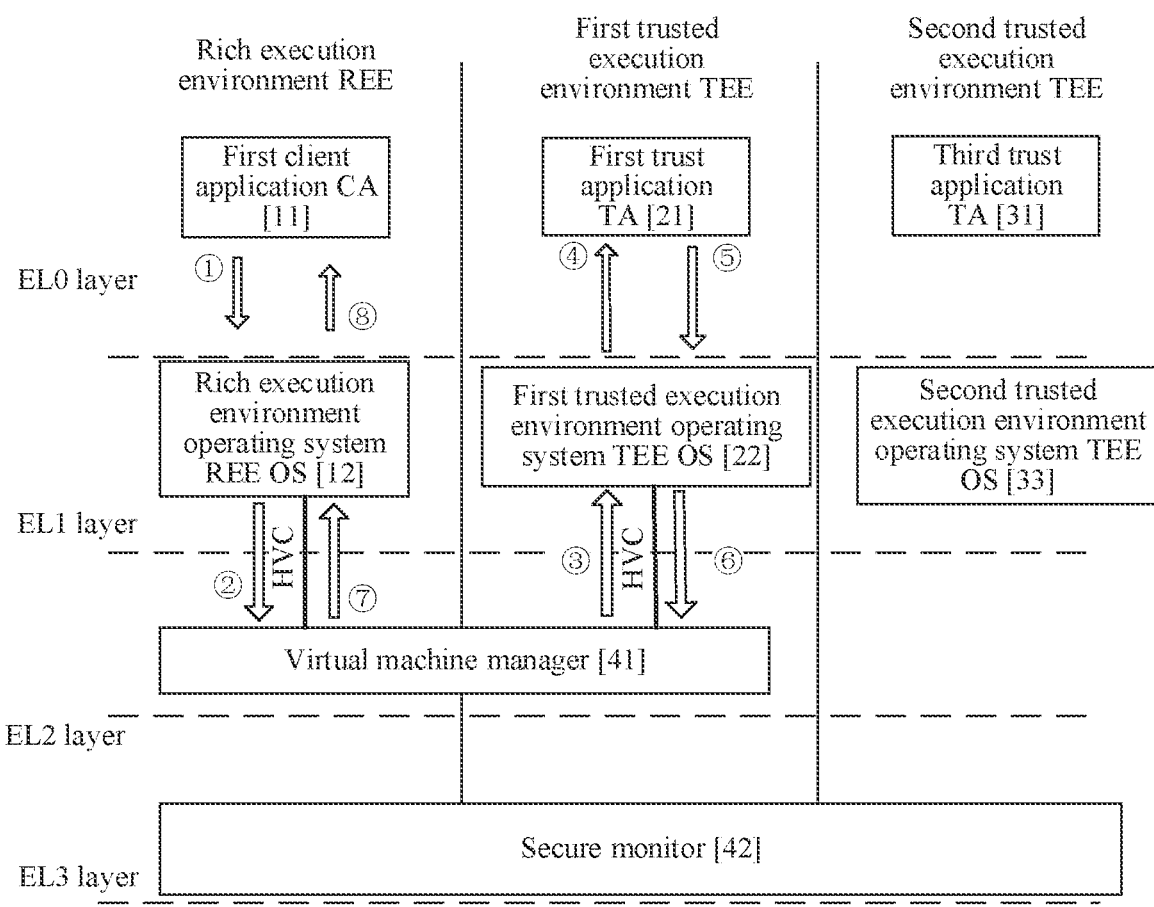
FIG. 2 is a schematic diagram of a first interaction process in a terminal device according to an embodiment of this application.

FIG. 2 is a schematic diagram of a first interaction process in a terminal device according to an embodiment of this application. FIG. 2 shows a process in which a first CA calls, through a virtual machine manager Hypervisor, a first TA to execute a service request.

As shown in FIG. 2, the first CA 11 in the REE generates a service processing request in response to an operation triggered by a user.

①When the first client application CA 11 needs to call the first trust application TA 21, the first client application CA 11 sends a request to the REE OS 12 by calling an API interface (not shown in the figure) in the REE.

②A kernel driver in the REE OS 12 sends the request of the CA to the virtual machine manager hypervisor 41 by calling an HVC (hypervisor call) instruction.

③The virtual machine manager hypervisor 41 processes the request of the CA based on the HVC instruction to transmit the request to a first trusted execution environment operating system TEE OS 22.

④The TEE OS 22 distributes the CA request to transmit the request of the CA to the corresponding first trust application TA 21.

⑤After processing the received request, the TA 21 sends a processing result to the TEE OS 22 by calling an interface (not shown in the figure) of the first trusted execution environment TEE.

⑥The TEE OS 22 returns the processing result to the hypervisor 41 by calling the HVC instruction.

⑦The hypervisor 41 parses the HVC instruction, and returns the processing result obtained after parsing to the REE OS 12.

⑧The REE OS 12 returns the processing result to the CA 11.

It can be learnt that, after the label ⑧, a process in which the first client application CA 11 responds to a service triggering operation according to the processing result is further included, and subsequent steps are not described again in this embodiment.

It can be learnt that the process of the second CA calling the second TA to execute the service request through the virtual machine manager Hypervisor is similar to the process of the first CA calling, through the virtual machine manager Hypervisor, the first TA to execute the service request shown in FIG. 2. Details are not described again herein.

Figure 3:
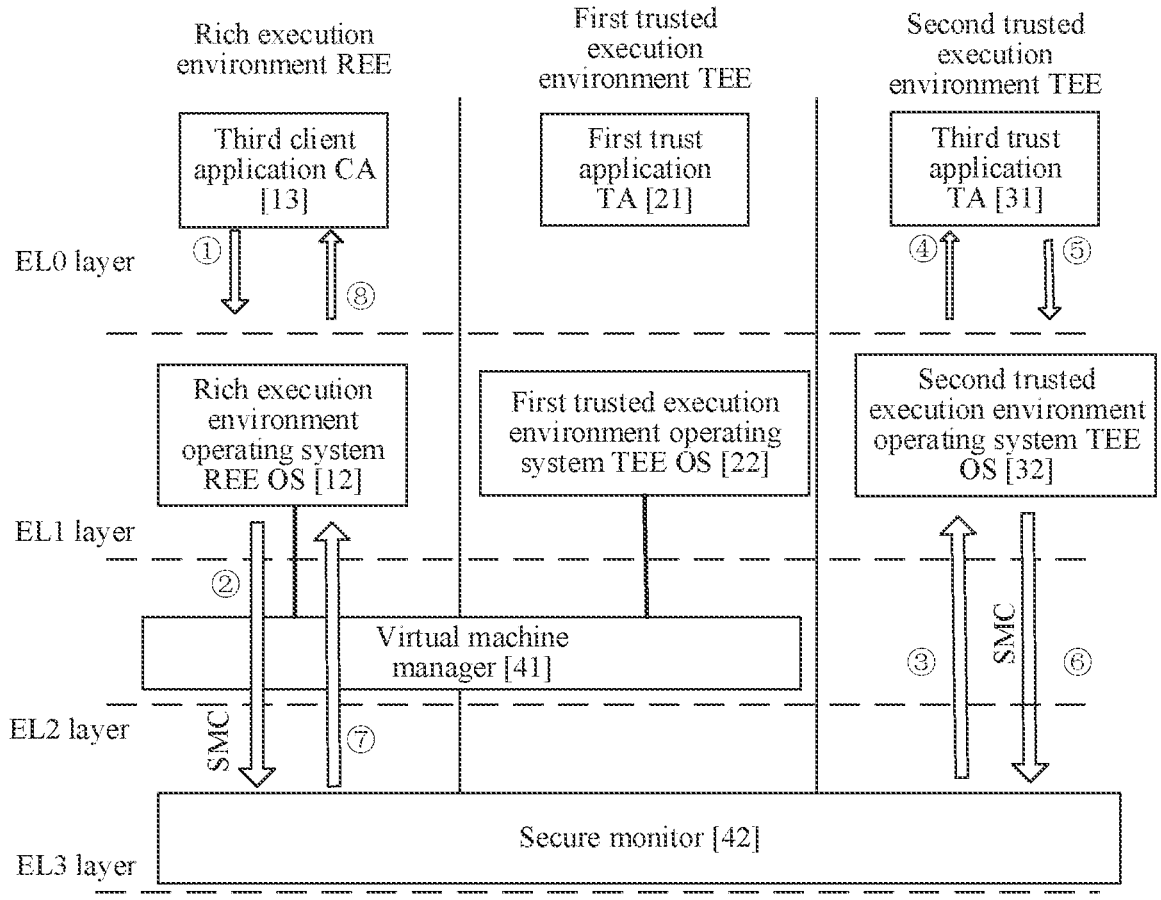
FIG. 3 is a schematic diagram of a second interaction process in a terminal device according to an embodiment of this application.

Based on the structure shown in FIG. 1, FIG. 3 is a schematic diagram of a second interaction process in a terminal device according to an embodiment of this application. In FIG. 3, a specific process of the third CA calling the third TA through the secure monitor Secure Monitor is indicated by arrows and labels ① to ③.

①When the third CA 13 in the REE needs to call the third TA 31 in the TEE, the third CA 13 sends a request to the REE OS 12 by calling an API interface (not shown in the figure) in the REE.

②A kernel driver in the REE OS 12 sends, by calling an SMC (Secure Monitor Call) instruction, the request of the CA to the security monitor 42 through transparent transmission by the virtual machine manager.

③The security monitor 42 parses the SMC instruction, and sends the parsed request to the TEE OS 32 in the second TEE.

④The TEE OS 32 distributes the request of the third CA to transmit the request of the third CA to the corresponding third TA 31.

⑤After processing the received request, the third TA 31 sends a processing result to the TEE OS 32 by calling an interface of the second trusted execution environment TEE (not shown in the figure).

⑥The TEE OS 32 returns the processing result to the security monitor 42 by calling the SMC instruction.

⑦The security monitor 42 parses the SMC instruction, and returns the processing result obtained after parsing to the REE OS 12.

⑧The REE OS 12 returns the processing result to the third CA 13.

Through the foregoing steps labeled ① to ⑧, the third CA 13 in the REE completes the calling of the third TA 31 in the second trusted execution environment TEE, and obtains the processing result.

It can be learnt that, after the label ⑧, a process in which the third CA 13 responds to a service triggering operation according to the processing result should be further included, and subsequent steps are not described again in this embodiment.

In some examples, the terminal device further includes a hardware platform for supporting the operation of the terminal device, and the hardware platform includes some secure hardware. For example, the secure hardware may include: physical hardware such as a secure memory, a secure keyboard and a camera.

Based on the foregoing framework and technology of the trusted execution environment, the client application CA of the REE of the terminal device can complete the access to the trust application TA in the first trusted execution environment TEE, and obtain the processing result.

As described above, the framework for implementing the trusted execution environment TEE based on the virtual machine technology provided above can realize secure service processing by using the CA in the rich execution environment to access the TA in the trusted execution environment. However, for the terminal device, the rich execution environment REE not only runs the client application CA, but also synchronously or asynchronously executes other processes. To ensure the smooth operation of each process, the REE OS collects statistics on execution of each process in the current REE environment to schedule processor resources of the terminal device, thereby ensuring the load balance of the processor resources.

However, when the REE OS schedules computing resources for processes including the CA, statistics on the resources already used by the current terminal device cannot be collected accurately, which causes the REE OS to over-estimate the computing capacity of the terminal device, resulting in jamming of the process due to insufficient computing resources. In particular, when the client application CA calls a trust application based on a virtual machine mechanism through the virtual machine manager, the fore-going problem is more obvious.

Under the virtual machine mechanism, the REE OS schedules computing resources by counting available time slices of a processor core. Since the REE environment and the first TEE environment are independent of each other under the virtual machine mechanism, the REE OS in the REE environment cannot perceive the occupation of the time slices in the processor core by the TA of the first TEE. Therefore, when the TA in the first TEE processes a service request after the CA in the REE complete sending the service request, the REE OS assumes that no process is executed in the processor core during this period, that is, the REE OS assumes that a quantity of available time slices of the current processor core=a total quantity of time slices of the proces-sor core.

However, in fact, when the TA in the first TEE executes the service requested by the CA, some of the time slices of the processor core may be occupied, that is, an actual quantity of available time slices of the current processor core=the total quantity of time slices of the processor core−a quantity of time slices occupied by the TA.

That is, the quantity of available time slices of the current processor core assumed by the REE OS is greater than the actual quantity of available time slices of the current pro-cessor core. During scheduling of time slice resources for the process, the REE OS can only refer to the assumed quantity of available time slices of the current processor core, which may lead to the aforementioned problem of inaccurate statistics on the current available time slices of the REE OS. It can be leant that a large error may seriously affect scheduling of other processes by the REE OS, result-ing in jamming of other processes and a failure in respond-ing to other tasks.

Based on the foregoing situation, in some embodiments of this application, a physical processor core running a CA may be dynamically mapped to a virtual processor core running a TA corresponding to the CA; in addition, a CPU yield (yield) mechanism may be used to enable the CA to yield time slice resources, which are scheduled by the REE OS for processes of the CA, to a process of the TA for use, and the CA maintains a working state when yielding the time slice resources, so as to solve the foregoing problems.

On the one hand, through dynamic mapping between the physical processor core and the virtual processor core, when the CA initiates a call for the first TEE, a currently used virtual processor core VCPU (such as VCPU0) is mapped to a physical processor core (such as CPU1) where the CA is currently run, that is, a mapping relationship between the two is established. The virtual machine manager Hypervisor schedules the VCPU0 to the current physical processor core CPU1 according to the mapping relationship, so that when the first TEE is run on the VCPU0, the first TEE actually is run on the real current physical processor core CPU1. In this way, when the first TEE runs the TA, the TA in the first TEE and the CA in the REE are run on the same physical processor core, making it possible for the virtual machine manager Hypervisor to schedule and yield the time slice resources of the CA to the TA for use.

On the other hand, in the CPU yield mechanism, CPU resources of a process of a CA can be yielded to another process/system for use. When the process of the CA yields the CPU resources, the CA process may maintain an execu-tion status. The CA is set to the execution status, but the time slices of the CA are allocated to the TA of the first TEE for running. In this case, the TA of the first TEE can respond to scheduling by any interruption of the REE, including a ticket-based resource interruption from the REE OS. If the CA is dispatched, the corresponding first TEE may no longer have the time slices allocated for running. Through the CPU yield mechanism, because the process of the CA is always kept in the execution status when the CPU resources are yielded, the CPU resources yielded by the CA process can also be counted by the REE OS.

Based on the foregoing mechanism, when the TA in the first TEE starts processing the service request after the CA in the REE completes sending the service request, in some embodiments of this application, a dynamic mapping may be established between the physical processor core running the CA and the virtual processor core running the TA corresponding to the CA; in addition, the CPU yield mecha-nism is used to enable the CA to yield the time slice resources, which are scheduled by the REE OS for the process of the CA, to the process of the TA for use, and the CA maintains the working state when yielding the time slice resources. During this period, for the REE OS, because the CA maintains the working state, the REE OS assumes that the quantity of currently available time slices of the proces-sor core=the total quantity of time slices of the processor core−the quantity of time slices occupied by the CA. Because the quantity of time slices occupied by the CA is the same as the quantity of time slices occupied by the TA, it can be obtained that: the actual quantity of currently available time slices of the processor core=the total quantity of time slices of the processor core−the quantity of time slices occupied by TA=the quantity of currently available time slices of the processor core assumed by the REE OS.

Therefore, in some embodiments of this application, the REE OS can effectively "perceive" the time slices occupied by the service executed by the TA, so that the REE OS can achieve resource load balance when scheduling resources.

Structures and frameworks involved in the embodiments of this application are introduced below.

Figure 4A:
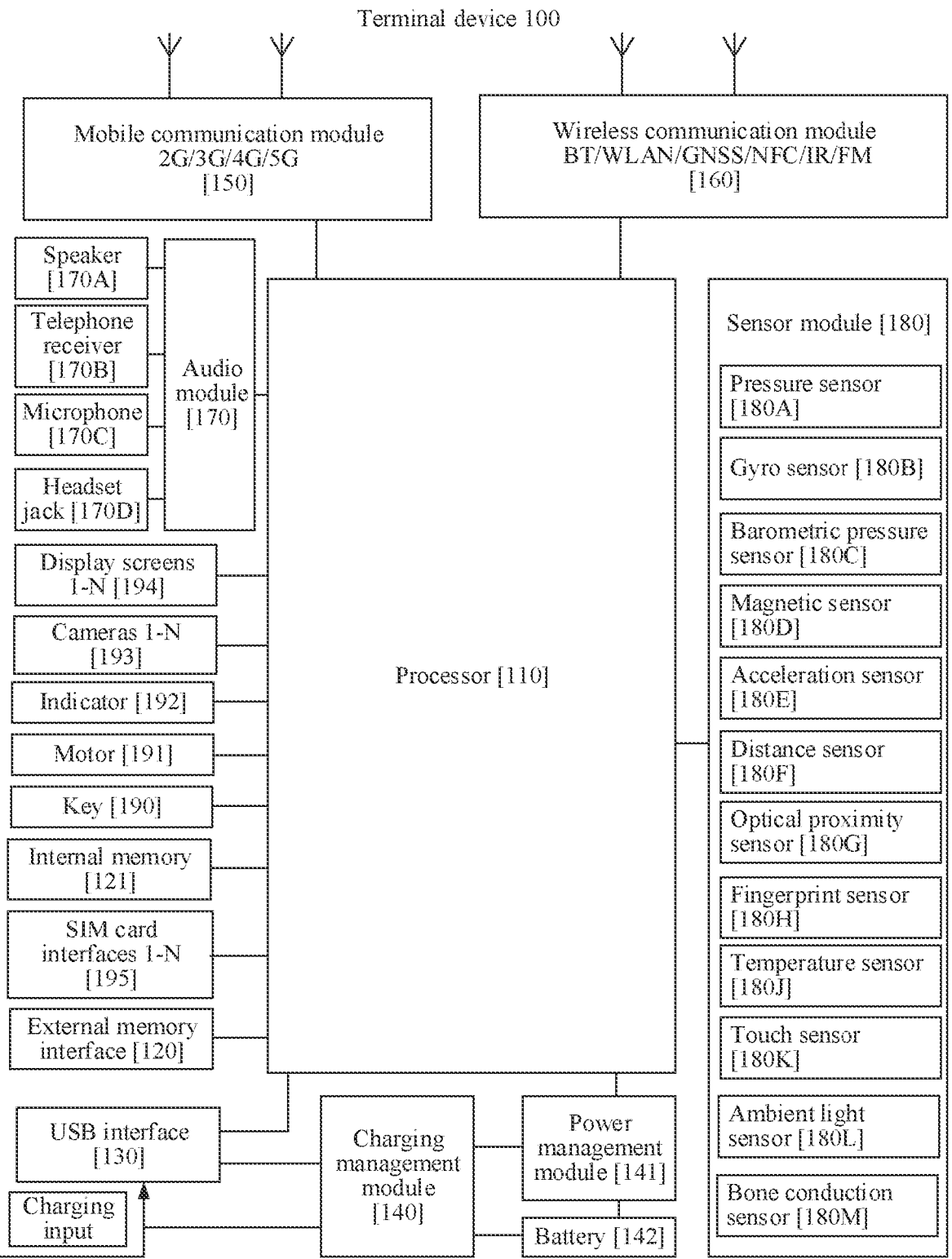
FIG. 4A is a schematic structural diagram of a terminal device applicable to an embodiment of this application.

A structure of the terminal device according to the embodiments of this application is first introduced. FIG. 4A is a schematic structural diagram of a terminal device applicable to an embodiment of this application.

As shown in FIG. 4A, the terminal device 100 may include: a processor 130, an external memory interface 130, an internal memory 121, a universal serial bus (universal serial bus, USB) interface 130, a charging management module 150, a power management unit 141, a battery 142, an antenna 1, an antenna 2, a mobile communication module 150, a wireless communication module 160, an audio mod-ule 170, a speaker 170A, a phone receiver 170B, a micro-phone 170C, a headset jack 170D, a sensor 180, a key 190, a motor 191, an indicator 192, a camera 193, a display screen 194, a subscriber identification module (subscriber identifi-cation module, SIM) card interface 195, and the like. It may be understood that the structure illustrated in this embodi-ment does not constitute a specific limitation to the terminal device 100. In some other embodiments of this application, the terminal device 100 may include more or fewer com-ponents than those shown in the figure, or combine some components, or split some components, or have different component arrangements. The components shown in the figure may be implemented with hardware, software, or a combination thereof.

The processor 130 may include one or more processing units. For example, the processor 130 may include an application processor (application processor, AP), a modem processor, a graphics processing unit (graphics processing unit, GPU), an image signal processor (image signal processor, ISP), a controller, a video code, a digital signal processor (digital signal processor, DSP), a baseband processor, a display process unit (display process unit, DPU), and/or a neural-network processing unit (neural-network processing unit, NPU). Different processing units may be independent components, or may be integrated into one or more processors. In some embodiments, the terminal device 100 may further include one or more processors 130. The processor may be a nerve center and a command center of the terminal device 100. The processor may generate an operating control signal according to an instruction operation code and a sequence signal, to complete control of fetching and executing an instruction. A memory may be further arranged in the processor 130, and is configured to store instructions and data. In some embodiments, the memory in the processor 130 is a cache memory. The memory may store an instruction or data that is recently used or cyclically used by the processor 130. If the processor 130 needs to use the instruction or the data again, the processor 130 may directly call the instruction or the data from the memory. This avoids repeated access, and reduces a waiting time of the processor 130, thereby improving the efficiency of the terminal device 100.

In some embodiments of this application, operating environments of the processor 130 may include: a REE and at least one first trusted execution environment TEE.

A trust application and a TEE OS are run in the TEE, and a client application and a REE OS are run in the REE. The REE is configured to receive a trust application request initiated by the user through the client application, and call the trust application TA in the TEE according to the trust application request, and the TA returns a corresponding result.

Figure 4B:
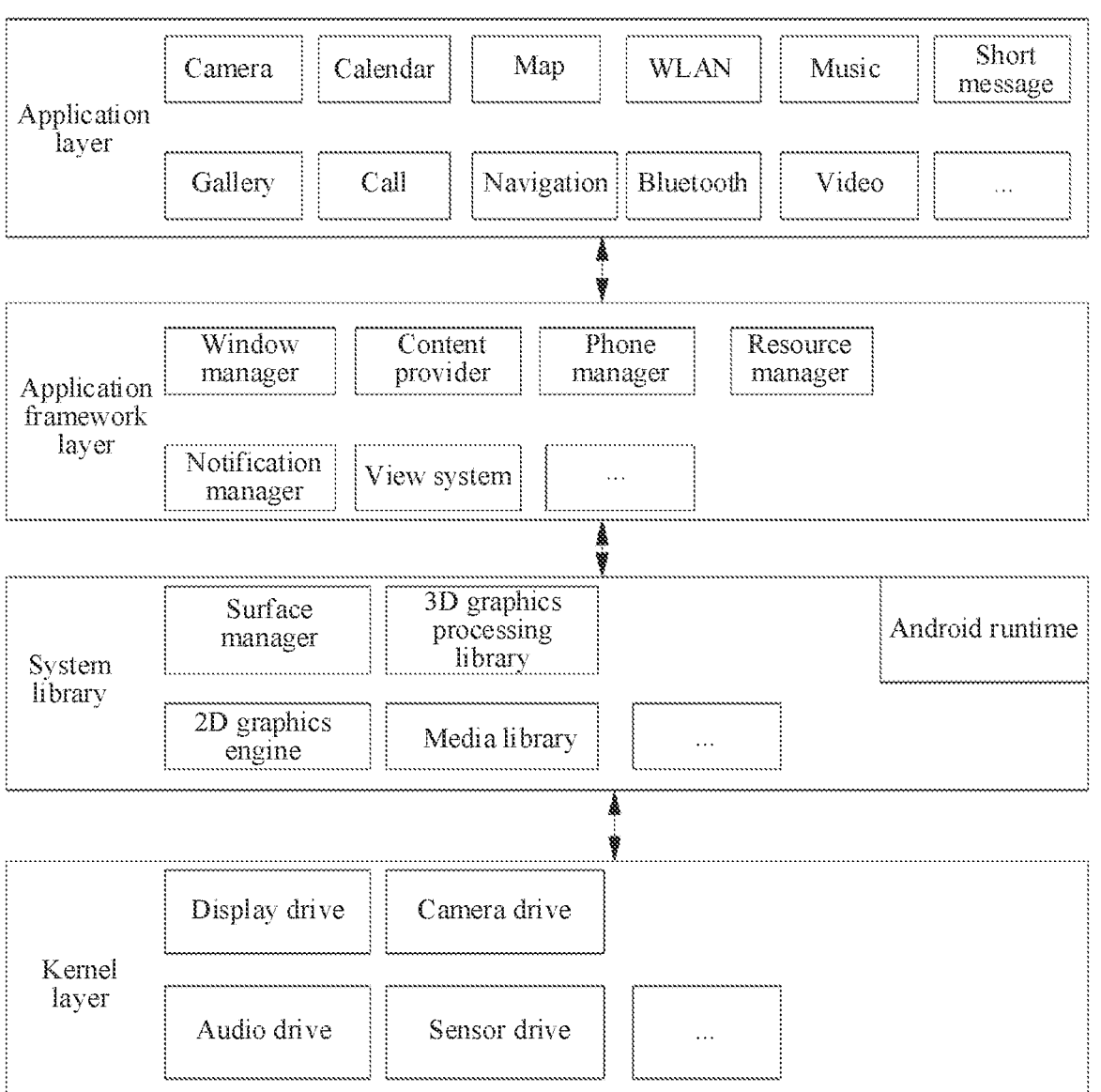
FIG. 4B is a block diagram of a software structure of a terminal device applicable to an embodiment of this application.

For example, FIG. 4B is a block diagram of a software structure of a terminal device applicable to an embodiment of this application. FIG. 4B shows a software hierarchical architecture in the rich execution environment REE. In the hierarchical architecture, software is divided into several layers, and each layer has a clear role and task. Layers communicate with each other through a software interface. In some embodiments, the Android system is divided into four layers, which are an application layer, an application framework layer, an Android runtime (Android runtime) and system library, and a kernel layer from top to bottom.

Figure 4C:
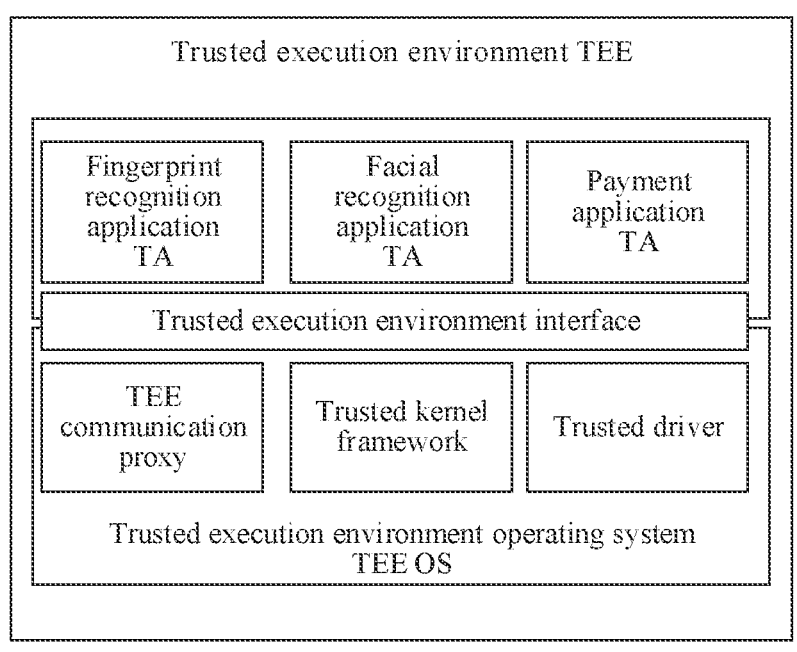
FIG. 4C is a block diagram of another software structure of a terminal device applicable to an embodiment of this application.

For example, FIG. 4C is a block diagram of another software structure of a terminal device applicable to an embodiment of this application. FIG. 4C shows a software hierarchical architecture of the first trusted execution environment TEE. The hierarchical architecture of the TEE generally includes at least one trust application, such as a fingerprint recognition application TA, a facial recognition application TA, and a payment application TA, as shown in FIG. 4C. These trust applications TAs can interact with the trusted execution environment operating system TEE OS through an interface API in the TEE. The trusted execution environment operating system TEE OS further includes a plurality of programs such as a TEE communication proxy, a trusted kernel framework, and a trusted driver. These programs cooperate with each other to support the operation of the trusted execution application TA.

Figure 4D:
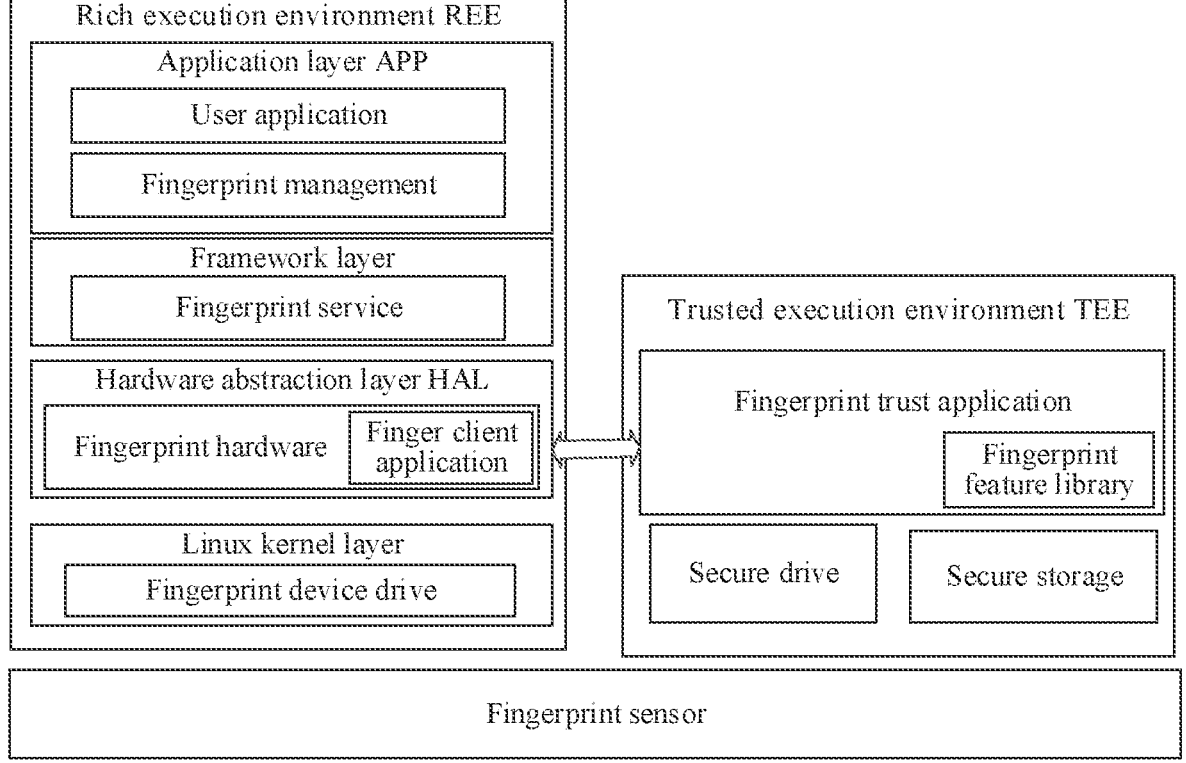
FIG. 4D is a block diagram of further another software structure of a terminal device applicable to an embodiment of this application.

For example, FIG. 4D is a block diagram of further another software structure of a terminal device applicable to an embodiment of this application, which shows a fingerprint software framework on Android. In this example, the REE environment is mainly divided into an application layer APP, a framework layer Framework, a hardware abstraction layer HAL, and a linux kernel layer (linux kernel). The APP is mainly responsible for call logic of fingerprint entry and unlocking, the Framework is mainly responsible for callback of related functions of the HAL layer, and the HAL layer is responsible for interacting with the hardware and the fingerprint TA. The TEE mainly includes the fingerprint TA, and the fingerprint TA is responsible for controlling a fingerprint sensor and executing functions related to a fingerprint algorithm.

To realize the processing of the service request in this application, based on the foregoing concept, a first virtual machine, a second virtual machine and a virtual machine manager Hypervisor may be arranged in the framework of the terminal device of this application. A rich execution environment REE is run in the first virtual machine, and a rich execution environment operating system REE OS and a plurality of client applications CAs are run in the rich execution environment REE. A first trusted execution environment TEE is run in the second virtual machine, and a first TEE OS and a plurality of trust applications TAs are run in the first TEE. Certainly, the following embodiments may be combined with each other, and the same or similar concepts or processes may not be described repeatedly in some embodiments.

Based on the foregoing concept, FIG. 5 is a schematic flowchart of a service processing method according to an embodiment of this application. As shown in FIG. 5, the process is a process of a first CA among the plurality of CAs in the REE calling a first TA, which corresponds to the first CA, among the plurality of TAs in the first TEE. It can be learnt that the correspondence between the CA and the TA may mean that services of the CA and the TA are associated. The TA corresponding to the CA can execute corresponding processing in response to the request of the CA to help the CA complete the corresponding service. As described above, when the CA executes a fingerprint verification service, the TA can be called to collect fingerprint data and perform data comparison.

In addition, to implement the calling, the virtual machine manager Hypervisor includes at least one communication channel, where each communication channel corresponds to one virtual processor core in the second virtual machine.

The service processing method in this application may include the following steps:

S501: A REE OS receives a first operation for starting a first CA.

Specifically, the first operation may be a preset operation triggered by a terminal device in response to a user. The first operation may include a touch operation instruction, a voice operation instruction, or a somatosensory operation instruction, and other operations for controlling the CA to start to enter the service processing flow.

S502: The REE OS allocates first time slice resources of a first physical processor core to the first CA in response to the first operation.

S503: The first CA occupies the first time slice resources after starting, and generates a first service processing request for calling a first TA to execute service processing.

The time slice resources refer to a microscopic period of processor core time allocated by a time-sharing operating system to each running process. Generally, the terminal device may include a plurality of physical processor cores. As described above, for the rich execution environment operating system REE OS, after the REE OS receives the first operation, the REE OS may allocate an idle physical processor core and idle time slice resources on the idle physical processor core to the CA based on the current resource load condition of the current physical processor core, so that the CA can be started and run by using these time slice resources. The REE OS obtains the current resource load condition of each physical processor core by collecting statistics on an execution status of each application in the REE. That is, the REE OS collects statistics on the execution status of each CA in the REE, to determine a current resource load condition of each physical processor core of the terminal device.

S504: The first CA sends the first service processing request to a virtual machine manager Hypervisor through a first communication channel.

S505: The virtual machine manager Hypervisor receives the first service processing request sent by the first CA, and maps and schedules, to the first physical processor core, a first virtual processor core in a second virtual machine corresponding to the first communication channel.

S506: The virtual machine manager Hypervisor sends the first service processing request to a first TEE OS.

S507: The first TEE OS starts on the first virtual processor core according to the first service processing request, and binds the first TA corresponding to the first CA with the first virtual processor core.

The communication channel can be understood as a communication interface or communication component for message transmission between different operating systems, and the communication channel is generally preset. The foregoing first communication channel may be one of at least one communication channel included in the virtual machine manager Hypervisor.

Figure 6:
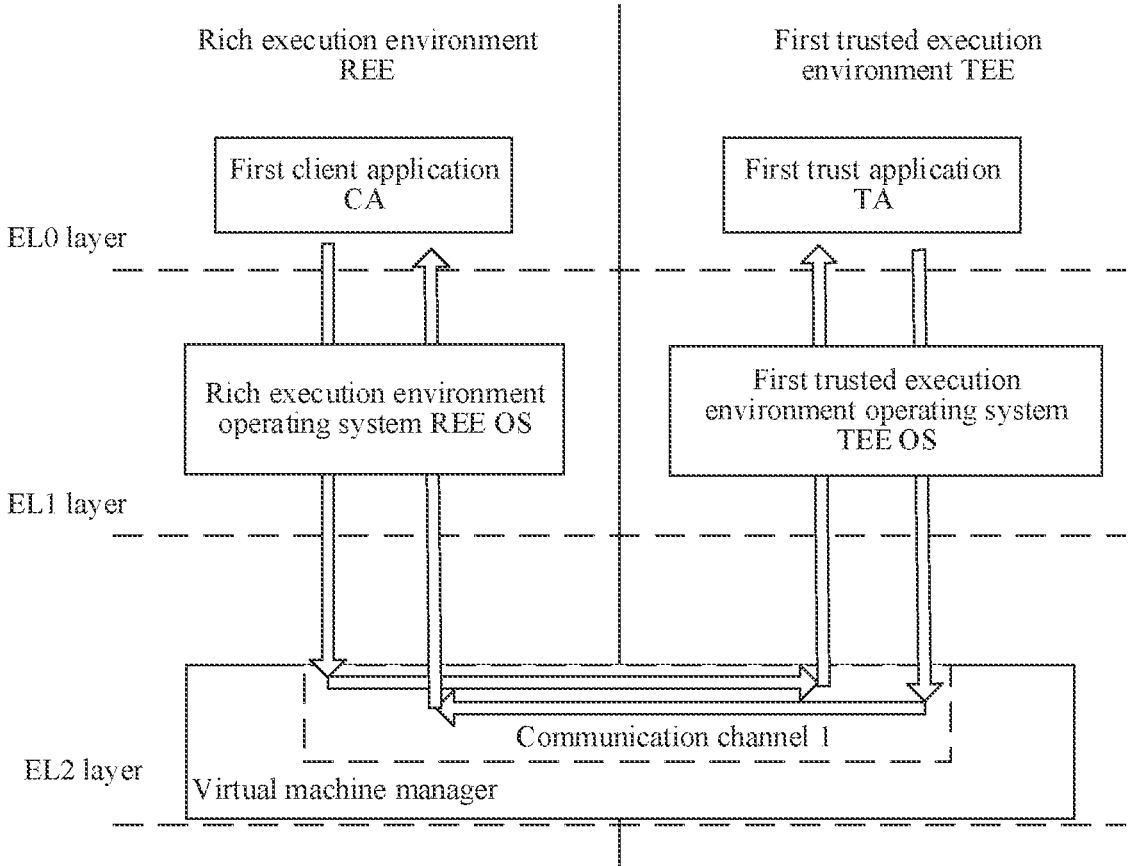
FIG. 6 is a schematic diagram of a communication channel of a virtual machine manager according to an embodiment of this application.

The first CA can call an HVC instruction through a kernel driver in the REE OS, and select an idle communication channel (that is, the first communication channel) from at least one communication channel included in the virtual machine manager Hypervisor to send the first service processing request to the virtual machine manager Hypervisor. FIG. 6 is a schematic diagram of a communication channel of a virtual machine manager according to an embodiment of this application. As shown in FIG. 6, the service processing request of the CA may be sent to the virtual machine manager Hypervisor through the communication channel 1. Similarly, the processing result obtained by the TA may be returned to the virtual machine manager Hypervisor through the communication channel 1.

After the virtual machine manager Hypervisor receives the first service processing request through the first communication channel, the virtual machine manager Hypervisor may map and schedule, to the first physical processor core, a first virtual processor core in the second virtual machine corresponding to the first communication channel.

The terminal device includes at least one real physical processor core CPU, and the virtual machine manager Hypervisor may manage at least one virtual processor core VCPU. In a state that no application or process is executed, the virtual processor core VCPU is mapped to a default physical processor core CPU.

In a case that the communication channel corresponds to the virtual processor core, when the virtual machine manager Hypervisor receives the first service processing request sent by the first CA through the first communication channel, the first virtual processor core corresponding to the first communication channel may be mapped on the physical processor core (that is, the first physical processor core) run by the first CA. By establishing the mapping, the virtual machine manager Hypervisor can schedule the time slice resources on the first physical processor core (the time slice resources are allocated by the REE OS to the first CA for use) to the first virtual processor core to serve as the time slice resources of the first virtual processor core. Then, the virtual machine manager Hypervisor may send the first service processing request to the TEE OS in the first TEE. In this case, because available time slice resources have been scheduled to the first virtual processor core, the first TEE OS may be started on the first virtual processor core. Then, the first TEE OS may call, according to the first service processing request, the first TA requested by the first service processing request, and the first TA may be directly started on the first virtual processor core to realize the binding between the first TA corresponding to the first CA and the first virtual processor core.

Figures 7, 8:
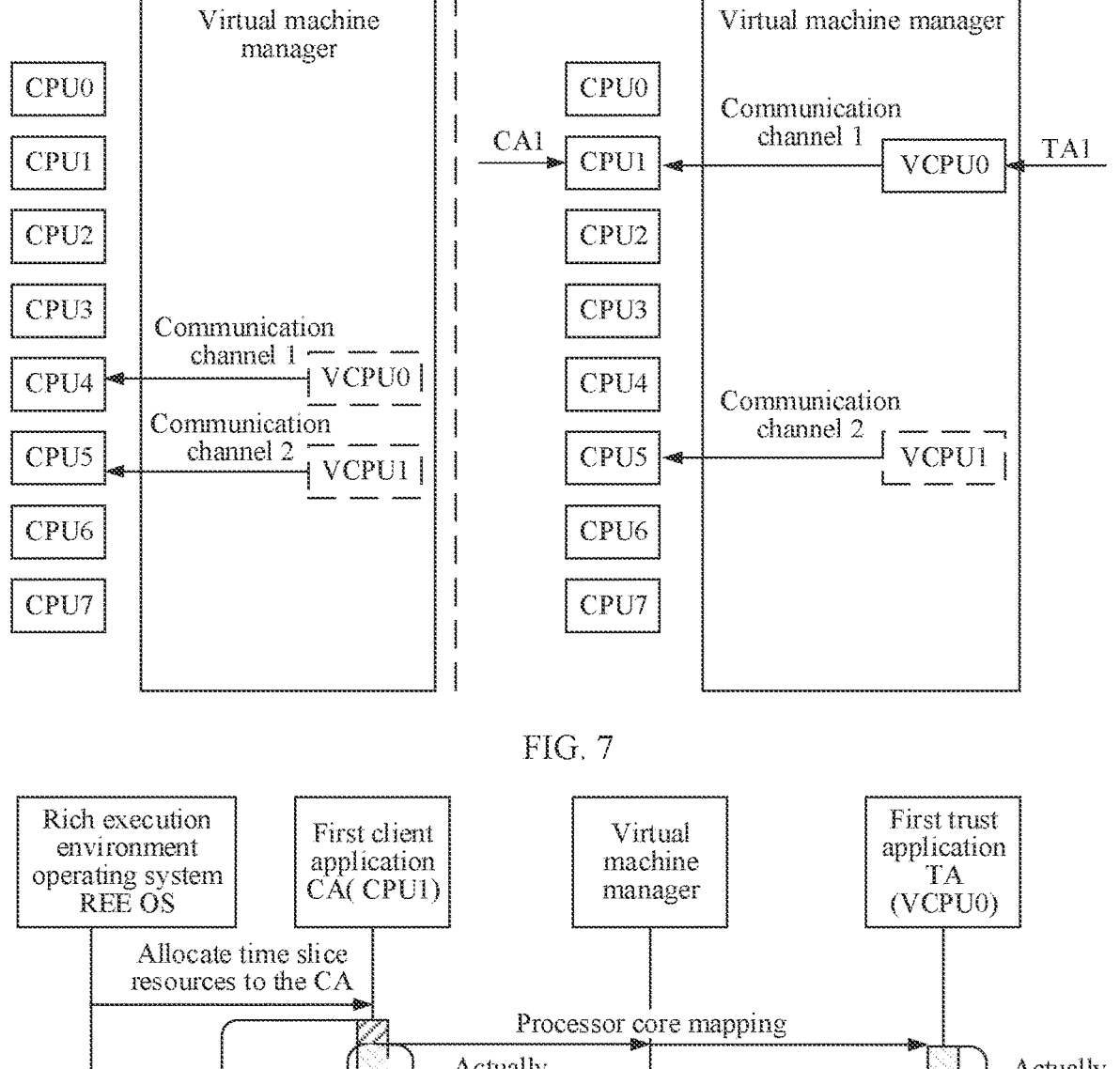
FIG. 7 is a schematic diagram of a first mapping relationship of processor cores according to an embodiment of this application.
FIG. 8 is a schematic diagram of first scheduling of time slice resources according to an embodiment of this application.

For example, FIG. 7 is a schematic diagram of a first mapping relationship of processor cores according to an embodiment of this application. As shown in FIG. 7, the terminal device includes at least one physical processor core, such as CPU0-CPU7. In addition, at least one virtual processor core, such as VCPU0 and VCPU1, may further be virtualized on the virtual machine manager Hypervisor.

As shown in the left part of FIG. 7, when no application or process is executed, VCPU0 corresponding to the communication channel 1 is mapped to CPU4, and VCPU1 corresponding to the communication channel 2 is mapped to CPU5. When CA1 is started and run on CPU1, as shown in the right part of FIG. 7, CA1 sends a service processing request to the virtual machine manager Hypervisor through the communication channel 1. In this case, the virtual machine manager Hypervisor maps and schedules VCPU0 corresponding to the communication channel 1 to CPU1. Because the communication channel 2 does not receive any request, VCPU1 corresponding to the communication channel 2 is still mapped on CPU5.

It should be noted that when a CA occupies time slice resources on a plurality of physical processor cores, the virtual machine manager Hypervisor can map the virtual processor core where the TA corresponding to the CA is located to some or all of the physical processor cores, that is, the mapping between the physical processor core and the virtual processor core may be one-to-one or many-to-one. Certainly, a quantity of processor cores during the mapping should depend on an actual running situation, which is not limited in this embodiment.

S508: The first CA yields second time slice resources in the first time slice resources to the first TA through the virtual machine manager Hypervisor, where the second time slice resources are currently remaining time slice resources in the first time slice resources.

S509: The first TA executes, by using some or all of the second time slice resources yielded by the first CA, a first service requested in the first service processing request.

Specifically, as described above, by using the CPU yield mechanism, the CA can "loan" the currently occupied time slice resources to the TA for use.

For example, FIG. 8 is a schematic diagram of first scheduling of time slice resources according to an embodiment of this application. In the embodiment shown in FIG. 8, the scheduling of time slice resources by the first CA in the REE and the first TA called by the first CA is shown. Before the first CA is started and after the REE OS service processing request, the REE OS may allocate the first time slice resources t1 to the first CA, to allow the first CA occupy the first time slice resources after starting. In this case, as described in the foregoing embodiments, through the dynamic mapping mechanism of the processor core, VCPU0 where the first TA is located may be mapped to CPU1 where the first CA is located. Under the scheduling by the virtual machine manager, the first CA can yield unused second time slice resources t2 in the current first time slice resources to the first TA. The first TA may use the second time slice resources to execute the corresponding first service.

It can be learnt that the execution status of the first CA is a working state in the process that the first TA uses the time slice resources yielded by the first CA. However, because the first CA always keep the working state during the period when the time slice resources are yielded, the REE OS can learn that the time slice resources allocated to the CA are constantly occupied, so that the REE OS can perceive the use of the time slice resources by the TA.

Through the foregoing mechanism, the REE OS can accurately determine the occupation of time slice resources by each physical processor core when collecting statistics on the current resource load condition of each physical processor core of the terminal device, to avoid the foregoing problem that scheduling of other processes by the REE OS is seriously affected due to the error in the statistics collected by the REE OS on the current available time slice resources, which causes jamming of other processes and a failure in responding to the tasks.

After the first TA completes the service processing, the virtual machine manager Hypervisor may release the foregoing mapping, and map the virtual processor core back to the default physical processor core (as shown in the left part of FIG. 7). On the basis of the foregoing embodiment, FIG. 9 is a schematic flowchart of another service processing method according to an embodiment of this application, which shows a process that the first TA obtains the processing result and feeds the processing result back to the first CA. Specifically, the process includes the following steps:

S901: A first TA obtains a processing result of a first service, and returns the processing result to a first CA through a virtual machine manager Hypervisor.

Specifically, as previously described, the first TA may use the second time slice resources yielded by the first CA to process the first service requested in the service processing request, to obtain a processing result of the first service, and return the processing result to the first CA in the REE through the previous communication channel.

S902: The first TA returns third time slice resources to the first CA after obtaining the processing result of the first service, where the third time slice resources refer to time slice resources not used by the first TA in the second time slice resources when the first TA obtains the processing result.

The returning, by the first TA, third time slice resources to the first CA includes: sending, by the first TEE OS, a first request to the virtual machine manager Hypervisor after the TA obtains the processing result of the service processing request, where the first request is used for instructing the virtual machine manager Hypervisor to release the mapping between the first virtual processor core and the first physical processor core; and releasing, by the virtual machine manager Hypervisor, the mapping between the first virtual processor core and the first physical processor core according to the first request.

Specifically, the first TA may use the borrowed time slice resources to execute the service requested in the first service request. Referring to FIG. 8, when the second time slice resources t2 yielded by the first CA to the first TA are more than the time slice resources required by the first TA to execute the first service (that is, the "actually borrowed time slice resources" shown in FIG. 10), the first TA may return the remaining unused time slice resources (that is, the third time slice resources, not shown in FIG. 8) in the second time slice resources t2 to the first TA.

When the third time slice resources is returned, the virtual machine manager Hypervisor may release the mapping between CPU1 and VCPU0. That is, the virtual machine manager Hypervisor may no longer schedule resources of CPU1 to VCPU0 through mapping. In this case, the returning of the third time slice resources is completed.

On the basis of the foregoing embodiments, the terminal device further supports concurrent processing for the CAs. In an implementation, the plurality of CAs further include a second CA; the plurality of TAs further include a second TA corresponding to the second CA; and the at least one communication channel includes a second communication channel. The method further includes: receiving, by the REE OS, a second operation for starting the second CA; allocating, by the REE OS, sixth time slice resources of a second physical processor core to the second CA in response to the second operation; occupying, by the second CA after starting, the sixth time slice resources, and generating, by the second CA, a second service processing request for calling the second TA to execute service processing; sending, by the second CA, the second service processing request to the virtual machine manager Hypervisor through the second communication channel; receiving, by the virtual machine manager Hypervisor, the second service processing request sent by the second CA, and mapping and scheduling, to the second physical processor core, a second virtual processor core in the second virtual machine corresponding to the second communication channel; sending, by the virtual machine manager Hypervisor, the second service processing request to the first TEE OS; binding, by the first TEE OS after starting on the second virtual processor core according to the second service processing request, the second TA corresponding to the second CA with the second virtual processor core; yielding, by the second CA, seventh time slice resources in the sixth time slice resources to the second TA through the virtual machine manager Hypervisor, where the seventh time slice resources are currently remaining time slice resources in the sixth time slice resources; and executing, by the second TA by using some or all of the seventh time slice resources yielded by the second CA, a second service requested in the second service processing request.

In this way, the rich execution environment may include a plurality of client applications. Different client applications can transmit service processing requests to the first trusted execution environment through different communication channels, to call trust applications corresponding to the client applications to execute service processing, thereby implementing concurrent service processing of multiple client applications based on a mapping mechanism.

When the terminal device simultaneously processes the service processing requests of a plurality of CAs in the REE, the virtual machine manager Hypervisor can simultaneously execute mapping processing for processor cores of the plurality of CAs and the TA corresponding to each CA.

To support the concurrent processing of service processing requests of the plurality of CAs, the virtual machine manager Hypervisor may include at least two communication channels, and each communication channel corresponds to one virtual processor core. Different communication channels in the virtual machine manager Hypervisor are configured to receive service processing requests sent by different CAs in the plurality of CAs. The virtual machine manager Hypervisor maps and schedules the virtual processor core corresponding to each communication channel to a physical processor core occupied by the corresponding CA For example, FIG. 10 is a schematic diagram of communication channels of another virtual machine manager according to an embodiment of this application. As shown in FIG. 10, the virtual machine manager Hypervisor includes a communication channel 1 and a communication channel 2.

The first CA sends a service processing request to the virtual machine manager Hypervisor through the first communication channel 1, and the second CA sends a service processing request to the virtual machine manager Hypervisor through the second communication channel 2. Correspondingly, the first TA corresponding to the first CA may return a processing result to the virtual machine manager Hypervisor through the communication channel 1, and the second TA corresponding to the second CA may return a processing result to the virtual machine manager Hypervisor through the communication channel 2.

Figure 11:
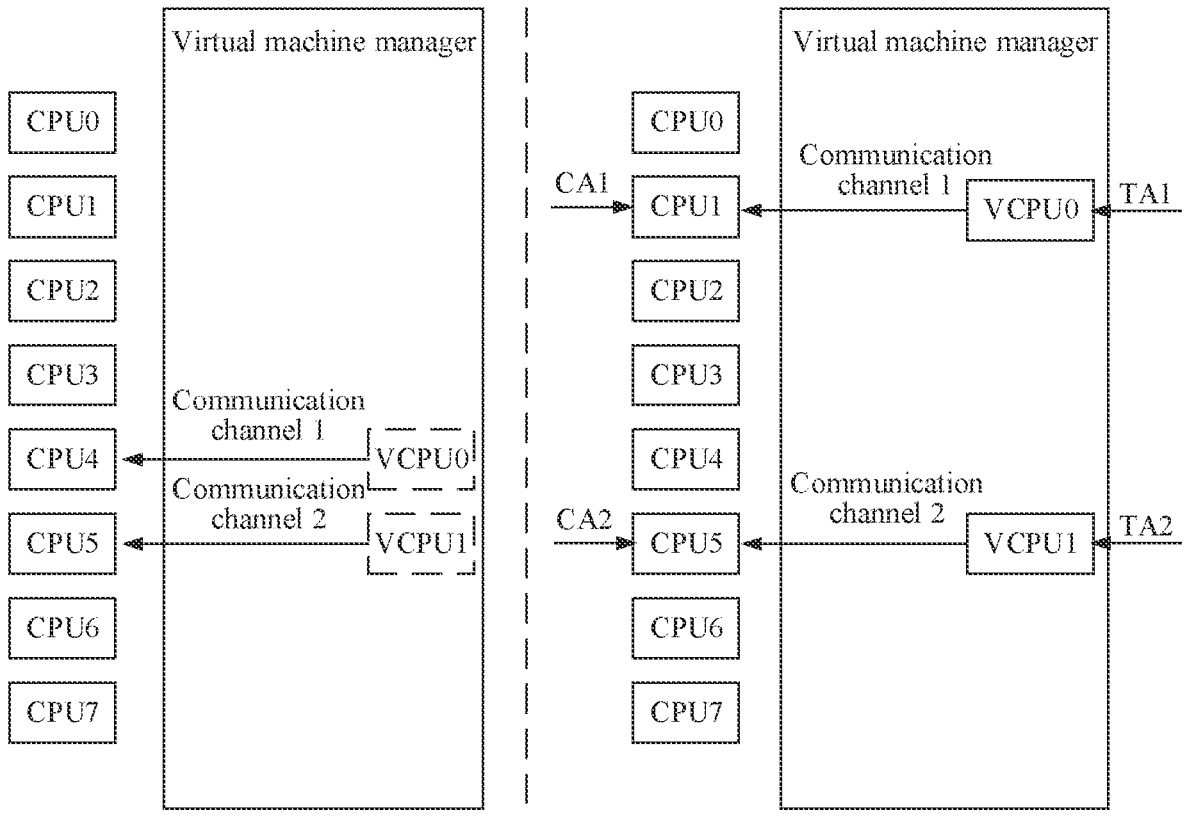
FIG. 11 is a schematic diagram of a second mapping relationship of processor cores according to an embodiment of this application.

FIG. 11 is a schematic diagram of a second mapping relationship of processor cores according to an embodiment of this application. As shown in the left part of FIG. 11, when no application or process is executed, VCPU0 corresponding to the communication channel 1 is mapped to CPU4, and VCPU1 corresponding to the communication channel 2 is mapped to CPU5. When CA1 is started and run on CPU1, as shown in the right part of FIG. 9, CA1 sends a service processing request to the virtual machine manager Hypervisor through the communication channel 1. In this case, the virtual machine manager Hypervisor maps and schedules VCPU0 corresponding to the communication channel 1 to CPU1. In addition, when CA2 is started and run on CPU5, as shown in the right part of FIG. 11, CA2 sends a service processing request to the virtual machine manager Hypervisor through the communication channel 2. In this case, the virtual machine manager Hypervisor maps and schedules VCPU1 corresponding to the communication channel 2 to CPU5.

It should be noted that for concurrent processing, when a plurality of CAs are run on the same CPU at the same time, the virtual machine manager Hypervisor may map and schedule each virtual processor core where the TA corresponding to each CA is located to the same CPU. That is, it is possible to map one CPU to a plurality of VCPUs. Certainly, a quantity of processor cores during the mapping should depend on an actual running situation, which is not limited in this embodiment.

In an implementation, a quantity of the virtual processor cores included in the virtual machine manager Hypervisor is less than or equal to a total quantity of the physical processor cores in the terminal device. By limiting the quantity of the virtual processor cores to limit the quantity of TAs running concurrently in the terminal device, the TAs are prevented from occupying too much resources of the physical processor cores, thereby ensuring the normal operation of the processes in the REE.

In the foregoing implementation, when the first TA uses the second time slice resources yielded by the first CA to execute service processing, an application process with a higher importance level may need to be started in the REE. In this case, the REE OS may reallocate and schedule the resources of the current processor core, so that the higher-level process can be executed first.

Based on this, in one of the cases, when the REE OS recovers the time slice resources previously allocated to the first CA, the time slice resources currently used by the first TA may be recovered together. In this case, the first TA stops processing the first service. Specifically, FIG. 12 is a schematic flowchart of further another service processing method according to an embodiment of this application. As shown in FIG. 12, the method further includes the following steps:

S1201: In a process of executing, by a first TAby using some or all of the second time slice resources yielded by a first CA, a first service requested in a service processing request, the first CA receives a first resource scheduling command initiated by a REE OS, where the first resource scheduling command is used for scheduling fourth time slice resources to another CA, and the fourth time slice resources are currently remaining time slice resources in the second time slice resources.

S1202: The first CA releases the fourth time slice resources according to the first resource scheduling command.

S1203: The first TA suspends the processing on the first service after the fourth time slice resources are released.

Figure 13:
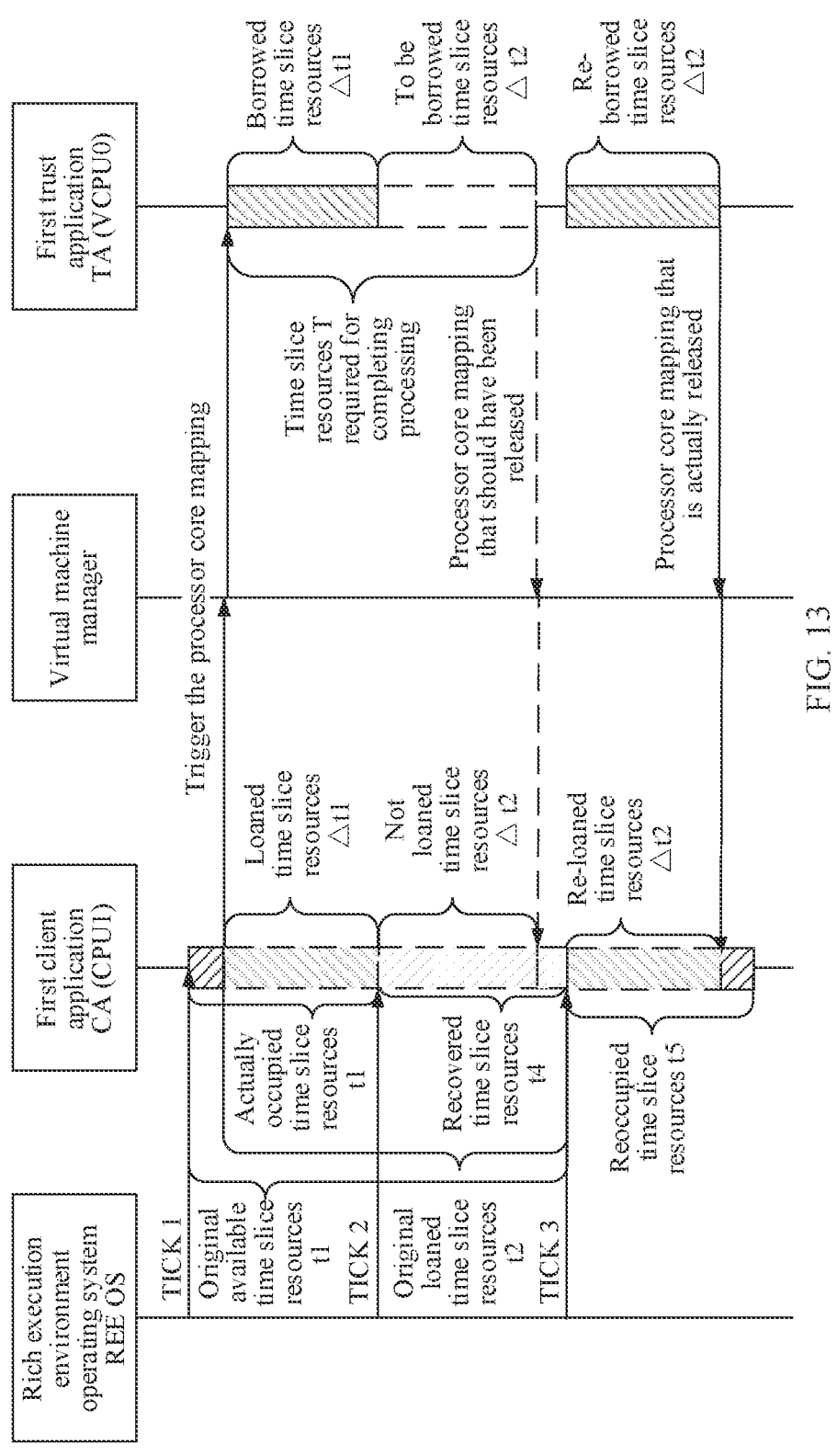
FIG. 13 is a schematic diagram of second scheduling of time slice resources according to an embodiment of this application.

Specifically, FIG. 13 is a schematic diagram of second scheduling of time slice resources according to an embodiment of this application.

As shown in FIG. 13, similar to the foregoing real-time manner, at a TICK1 moment, the REE OS allocates the first time slice resources t1 of CPU1 to the first CA, and the first CA may yield unused second time slice resources t2 in the first time slice resources t1 to the first TA for use. However, in the process of the first TA executing the service by using t2, an application process with a higher importance level in the REE needs to be run. The REE OS may recount the current time slice resources of each processor core of the terminal device, and the scheduling result is that the currently remaining time slice resources t4 (that is, the fourth time slices) in the second time slice resources t2 need to be scheduled to other CAs for use.

At the moment of TICK2, the first CA may receive a first resource scheduling instruction from the REE OS, and under the first resource scheduling instruction, the first CA may directly release the fourth time slice resources t4. In addition, because the fourth time slice resources t4 are recovered, the first TA has no available time slice resources at this time, and may suspend the processing of the first service.

It should be noted that when the fourth time slice resources are recovered, the mapping between CPU1 where the first CA is located and VCPU0 where the first TA is located may still be established. That is, once the first CA regains the time slice resources of CPU1, the virtual machine manager can directly schedule resources of CPU1 to VCPU0 based on the mapping, so that the first TA continues to use the resources. It can be learnt that the execution status of the first CA is a working state when the first TA uses the second time slice resources t2 yielded by the first CA; and the execution status of the first CA is an idle state after the first CA releases the fourth time slice resources t4.

That is, the time slice resources may further be reallocated to the first CA after a period of time after the fourth time slice resources are released. Still referring to FIG. 12, the method further includes the following steps:

S1204: The first CA receives a second resource scheduling command initiated by the REE OS after a period of time since the fourth time slice resources are released, where the second resource scheduling command is used for allocating fifth time slice resources of a first physical processor core to the first CA.

S1205: The first CA occupies the fifth time slice resources, and yields the fifth time slice resources to the first TA through a virtual machine manager Hypervisor.

S1206: The first TA continues to execute the first service by using some or all of the fifth time slice resources yielded by the first CA.

Still referring to FIG. 13, in the process of the first TA suspending the execution of the service processing request, it is assumed that the time slice resources required by the first TA to complete the first service is T. In this case, the time slice resources already borrowed by the first TA are $\Delta t1$, and to complete the processing of the first service, the first TA further needs to borrow time slice resources $\Delta t2$.

As the process proceeds, at a TICK3 moment, the REE OS can reallocate the time slice resources of CPU1, that is, the fifth time slice resources, to the first CA A second resource scheduling request initiated by the REE OS may be received. The second resource scheduling request is used for reallocating the time slice resources on the physical processor core to the client application CA. In this case, the client application CA may reoccupy the fifth time slice resources t5.

In this case, based on the mapping and scheduling described previously, the virtual machine manager may reschedule the fifth time slice resources t5 to the first TA for use, and the first TA may continue to execute the first service until the first TA uses the time slice resources of $\Delta t2$; at this point, the first service is completed. In this case, the first TA may return the remaining time slice resources (t5−$\Delta t2$) and feed back the processing result, as described in the previous embodiment. For a process of returning the processing result, reference may be made to the foregoing embodiments, and details are not described herein again.

Through the foregoing process, this application can effectively enable the REE OS to "perceive" the service executed by the TA, so that the REE OS can achieve resource load balance during resource scheduling.

It should be noted that on the basis of the foregoing implementations, the scheduling of each TA in the first trusted execution environment based on the virtual machine provided in this application can further be used in combination with the second trusted execution environment of the trust zone technology. That is, in the architecture shown in FIG. 1, the foregoing implementations can still be used to schedule the time slice resources in the first trusted execution environment in the framework. For specific implementations, reference may be made to the foregoing description, and details are not described herein again.

Figure 14:
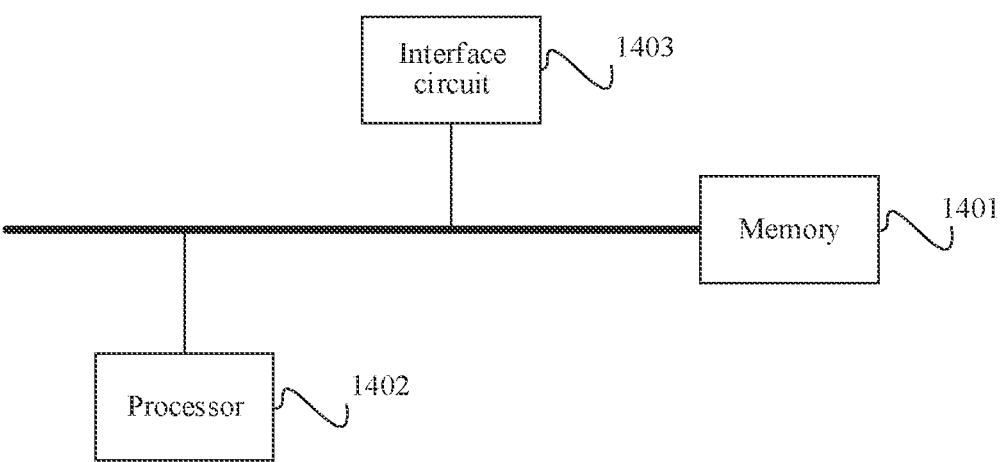
FIG. 14 is a schematic diagram of a hardware structure of a service processing apparatus according to an embodiment of this application.

FIG. 14 is a schematic diagram of a hardware structure of a service processing apparatus according to an embodiment of this application. Referring to FIG. 14, the apparatus includes: a memory 1401, a processor 1402, and an interface circuit 1403. The memory 1401, the processor 1402, and the interface circuit 1403 may communicate with each other. For example, the memory 1401, the processor 1402, and the interface circuit 1403 may communicate with each other through a communication bus. The memory 1401 is configured to store computer-executable instructions, the processor 1402 controls execution, and the interface circuit 1403 performs communication, to implement the service processing method provided in the embodiments of this application.

In an implementation, the interface circuit 1403 may further include a transmitter and/or a receiver. In an implementation, the processor 1402 may include one or more CPUs, or may be another general-purpose processor, a digital signal processor (digital signal processor, DSP), an application specific integrated circuit (application specific integrated circuit, ASIC), or the like. The general-purpose processor may be a microprocessor, or the processor may be any conventional processor, or the like. The steps of the methods disclosed with reference to this application may be directly implemented by a hardware processor, or may be implemented by a combination of hardware and a software module in a processor.

In a possible implementation, the computer executable instructions in this embodiment of this application may also be referred to as application code. This is not specifically limited in this embodiment of this application.

The service processing apparatus provided in the embodiments of this embodiment is configured to perform the service processing method in the foregoing embodiment. Their technical principles and technical effects are similar, and details are not described herein again.

The embodiments of this application provide a terminal device. A memory of the terminal device may be configured to store at least one program instruction, and a processor is configured to execute the at least one program instruction, to implement the technical solutions of the foregoing method embodiments. Their implementation principles and technical effects are similar those in the method-related embodiments, and details are not described herein again.

The embodiments of this application provide a chip. The chip includes a processor, and the processor is configured to call a computer program in a memory to perform the technical solutions in the foregoing embodiments. Their implementation principles and technical effects are similar those in the related embodiments, and details are not described herein again.

The embodiments of this application provide a computer program product, causing, when run on a terminal device, the terminal device to perform the technical solutions in the foregoing embodiments. Their implementation principles and technical effects are similar those in the related embodiments, and details are not described herein again.

In the embodiments of this application, words such as "first" and "second" are used to distinguish same or similar items with a basically same function and role. For example, a first chip and a second chip are merely used to distinguish between different chips, and are not intended to limit a sequence thereof. A person skilled in the art may understand that the terms such as "first" and "second" do not define a quantity and an execution sequence, and the terms such as "first" and "second" do not indicate a definite difference.

In the embodiments of this application, "at least one" refers to one or more, and "a plurality of" refers to two or more. And/or describes an association relationship for describing associated objects and represents that three relationships may exist. For example, A and/or B may represent the following three cases: only A exists, both A and B exist, and only B exists, where A and B may be singular or plural. The character "/" generally indicates an "or" relationship between the associated objects. "At least one of the following items" or a similar expression means any combination of these items, including a single item or any combination of a plurality of items. For example, at least one of a, b, or c may represent: a, b, c, a-b, a-c, b-c, or a-b-c, where a, b, and c may be single or multiple.

The service processing method provided in this embodiment of this application is applicable to a terminal device provided with a trusted execution environment. The terminal device may also be referred to as a terminal (terminal), user equipment (user equipment, UE), a mobile station (mobile station, MS), a mobile terminal (mobile terminal, MT), or the like. The terminal device may be a mobile phone (mobile phone), a smart TV, a wearable device, a tablet computer (Pad), a computer with a wireless transceiver function, a virtual reality (virtual reality, VR) terminal device, an augmented reality (augmented reality, AR) terminal device, a wireless terminal in industrial control (industrial control), a wireless terminal in self-driving (self-driving), a wireless terminal in remote surgery (remote medical surgery), a wireless terminal in a smart grid (smart grid), a wireless terminal in transportation safety (transportation safety), a wireless terminal in a smart city (smart city), a wireless terminal in a smart home (smart home), and the like. The foregoing specific implementations further describe the objectives, technical solutions in detail, and beneficial effects of the present invention. It should be appreciated that the foregoing descriptions are merely specific implementations of the present invention, but are not intended to limit the protection scope of the present invention. Any modification, equivalent replacement, or improvement made based on the technical solutions of the present invention should fall within the protection scope of the present invention.

What is claimed is:

1. A service processing method, applicable to a terminal device comprising a first virtual machine, a second virtual machine, and a hypervisor, wherein the first virtual machine comprises at least one physical processor core, a rich execution environment (REE) is run in the first virtual machine, a first trusted execution environment (TEE) is run in the second virtual machine, an REE operating system (OS) and a plurality of client applications (CAs) are run in the REE, and a first TEE OS and a plurality of trust applications (TAs) are run in the first TEE, wherein the plurality of CAs comprises a first CA, wherein the plurality of TAs comprises a first TA corresponding to the first CA, wherein the hypervisor comprises at least one communication channel, each communication channel corresponding to one virtual processor core in the second virtual machine, and wherein the at least one communication channel comprises a first communication channel, the method comprising:

receiving, by the REE OS, a first operation for starting the first CA;

allocating, by the REE OS, first time slice resources of a first physical processor core to the first CA in response to the first operation;

occupying, by the first CA after starting, the first time slice resources, and generating, by the first CA, a first service processing request for calling the first TA to execute service processing;

sending, by the first CA, the first service processing request to the hypervisor through the first communication channel;

receiving, by the hypervisor, the first service processing request from the first CA, and mapping and scheduling, to the first physical processor core, a first virtual processor core in the second virtual machine corresponding to the first communication channel;

sending, by the hypervisor, the first service processing request to the first TEE OS;

binding, by the first TEE OS after starting on the first virtual processor core according to the first service processing request, the first TA corresponding to the first CA with the first virtual processor core;

yielding, by the first CA, second time slice resources in the first time slice resources to the first TA through the hypervisor, wherein the second time slice resources are currently remaining time slice resources in the first time slice resources; and executing, by the first TA by using some or all of the second time slice resources yielded by the first CA, a first service requested in the first service processing request.

2. The service processing method of claim 1, wherein an execution status of the first CA is a working state when the first TA uses the time slice resources yielded by the first CA, the method further comprising collecting, by the REE OS, statistics on an execution status of each CA in the REE, to determine a current resource load condition of each physical processor core of the terminal device.

3. The service processing method of claim 1, wherein the hypervisor comprises at least two communication channels, and each communication channel corresponds to one virtual processor core, wherein different communication channels in the hypervisor are configured to receive service processing requests from different CAs in the plurality of CAs, and wherein the hypervisor maps and schedules the virtual processor core corresponding to each communication channel to a physical processor core occupied by the corresponding CA.

4. The service processing method of claim 1, wherein a quantity of the virtual processor cores in the hypervisor is less than or equal to a total quantity of the physical processor cores in the terminal device.

5. The service processing method of claim 1, further comprising:

obtaining, by the first TA, a processing result of the first service, and returning the processing result to the first CA through the hypervisor; and returning, by the first TA, third time slice resources to the first CA after obtaining the processing result of the first service, wherein the third time slice resources refer to time slice resources not used by the first TA in the second time slice resources when the first TA obtains the processing result, and wherein returning third time slice resources to the first CA comprises:

sending, by the first TEE OS, a first request to the hypervisor after the TA obtains the processing result of the service processing request, wherein the first request instructs the hypervisor to release the mapping between the first virtual processor core and the first physical processor core; and releasing, by the hypervisor, the mapping between the first virtual processor core and the first physical processor core according to the first request.

6. The service processing method of claim 1, further comprising:

receiving, by the first CA, a first resource scheduling command initiated by the REE OS in the process of executing, by the first TA by using some or all of the second time slice resources yielded by the first CA, the first service requested in the service processing request, wherein the first resource scheduling command is to schedule fourth time slice resources to another CA, and the fourth time slice resources are currently remaining time slice resources in the second time slice resources;

releasing, by the first CA, the fourth time slice resources according to the first resource scheduling command; and suspending, by the first TA, the processing on the first service after the fourth time slice resources are released.

7. The service processing method of claim 6, wherein after a period of time since the fourth time slice resources are released, the method further comprises:

receiving, by the first CA, a second resource scheduling command initiated by the REE OS, wherein the second resource scheduling command is to allocate fifth time slice resources of the first physical processor core to the first CA;

occupying, by the first CA, the fifth time slice resources, and yielding the fifth time slice resources to the first TA through the hypervisor; and continuing to execute, by the first TA, the first service by using some or all of the fifth time slice resources yielded by the first CA.

8. The service processing method of claim 6, wherein an execution status of the first CA is a working state when the first TA uses the second time slice resources yielded by the first CA, and wherein the execution status of the first CA is an idle state after the first CA releases the fourth time slice resources.

9. The service processing method of claim 1, wherein the plurality of CAs further comprise a second CA, wherein the plurality of TAs further comprise a second TA corresponding to the second CA, and wherein the at least one communication channel further comprises a second communication channel, the method further comprising:

receiving, by the REE OS, a second operation for starting the second CA;

allocating, by the REE OS, sixth time slice resources of a second physical processor core to the second CA in response to the second operation;

occupying, by the second CA after starting, the sixth time slice resources, and generating, by the second CA, a second service processing request for calling the second TA to execute service processing;

sending, by the second CA, the second service processing request to the hypervisor through the second communication channel;

receiving, by the hypervisor, the second service processing request from the second CA, and mapping and scheduling, to the second physical processor core, a second virtual processor core in the second virtual machine corresponding to the second communication channel;

sending, by the hypervisor, the second service processing request to the first TEE OS;

binding, by the first TEE OS after starting on the second virtual processor core according to the second service processing request, the second TA corresponding to the second CA with the second virtual processor core;

yielding, by the second CA, seventh time slice resources in the sixth time slice resources to the second TA through the hypervisor, wherein the seventh time slice resources are currently remaining time slice resources in the sixth time slice resources; and executing, by the second TA by using some or all of the seventh time slice resources yielded by the second CA, a second service requested in the second service processing request.

10. The service processing method of claim 1, wherein the terminal device further comprises a trust zone and a secure monitor, wherein a second TEE is run in the trust zone, and a plurality of TAs comprising a third TA are run in the second TEE.

11. The service processing method of claim 10, wherein the plurality of CAs further comprise a third CA that corresponds to the third TA, the method further comprising:

receiving, by the REE OS, a third operation for starting the third CA;

generating, by the third CA after starting, a third service processing request for calling the third TA to execute service processing;

sending, by the third CA, the third service processing request to the third TA in the second TEE through the secure monitor;

processing, by the third TA, a third service requested in the third service processing request to obtain a processing result; and returning, by the third TA, the processing result of the third service to the third CA through the secure monitor.

12. A terminal device, comprising:

a first virtual machine implemented by at least one physical processor core of the terminal device, wherein the first virtual machine is configured to run a rich execution environment (REE), wherein an REE operating system (OS) and a plurality of client applications (CAs) are run in the REE, wherein the plurality of CAs comprises a first CA;

a second virtual machine configured to run a first trusted execution environment (TEE), wherein a first TEE OS and a plurality of trust applications (TAs) are run in the first TEE, wherein the plurality of TAs comprises a first TA corresponding to the first CA; and a hypervisor comprising at least one communication channel, wherein each communication channel corresponds to one virtual processor core in the second virtual machine, and wherein the at least one communication channel comprises a first communication channel, wherein the REE OS is configured to:

receive a first operation for starting the first CA; and allocate first time slice resources of a first physical processor core to the first CA in response to the first operation, wherein the first CA is configured to:

occupy, after starting, the first time slice resources;

generate a first service processing request for calling the first TA to execute service processing; and send the first service processing request to the hypervisor through the first communication channel, wherein the hypervisor is configured to:

receive the first service processing request from the first CA;

map and schedule, to the first physical processor core, a first virtual processor core in the second virtual machine corresponding to the first communication channel; and send the first service processing request to the first TEE OS, wherein the first TEE OS, after starting on the first virtual processor core according to the first service processing request, is configured to bind the first TA corresponding to the first CA with the first virtual processor core, wherein the first CA is configured to yield second time slice resources in the first time slice resources to the first TA through the hypervisor, wherein the second time slice resources are currently remaining time slice resources in the first time slice resources, and wherein the first TA is configured to execute a first service requested in the first service processing request by using some or all of the second time slice resources yielded by the first CA.

13. The terminal device of claim 12, wherein an execution status of the first CA is a working state when the first TA uses the time slice resources yielded by the first CA, wherein the REE OS is configured to collect statistics on an execution status of each CA in the REE, to determine a current resource load condition of each physical processor core of the terminal device.

14. The terminal device of claim 12, wherein the hypervisor comprises at least two communication channels, and each communication channel corresponds to one virtual processor core, wherein different communication channels in the hypervisor are configured to receive service processing requests from different CAs in the plurality of CAs, and wherein the hypervisor maps and schedules the virtual processor core corresponding to each communication channel to a physical processor core occupied by the corresponding CA.

15. The terminal device of claim 12, wherein a quantity of the virtual processor cores in the hypervisor is less than or equal to a total quantity of the physical processor cores in the terminal device.

16. The terminal device of claim 12, wherein the first TA is configured to:

obtain a processing result of the first service;

return the processing result to the first CA through the hypervisor; and return third time slice resources to the first CA after obtaining the processing result of the first service, wherein the third time slice resources refer to time slice resources not used by the first TA in the second time slice resources when the first TA obtains the processing result, and wherein returning third time slice resources to the first CA comprises:

sending, by the first TEE OS, a first request to the hypervisor after the TA obtains the processing result of the service processing request, wherein the first request instructs the hypervisor to release the mapping between the first virtual processor core and the first physical processor core; and releasing, by the hypervisor, the mapping between the first virtual processor core and the first physical processor core according to the first request.

17. The terminal device of claim 12, wherein the first CA is configured to:

receive a first resource scheduling command initiated by the REE OS in the process of executing, by the first TA by using some or all of the second time slice resources yielded by the first CA, the first service requested in the service processing request, wherein the first resource scheduling command is to schedule fourth time slice resources to another CA, and the fourth time slice resources are currently remaining time slice resources in the second time slice resources; and release the fourth time slice resources according to the first resource scheduling command, wherein the first TA is configured to suspend the processing on the first service after the fourth time slice resources are released.

18. The terminal device of claim 17, wherein after a period of time since the fourth time slice resources are released, the first CA is further configured to:

receive a second resource scheduling command initiated by the REE OS, wherein the second resource scheduling command is to allocate fifth time slice resources of the first physical processor core to the first CA;

occupy the fifth time slice resources; and yield the fifth time slice resources to the first TA through the hypervisor, wherein the first TA is configured to continue to execute the first service by using some or all of the fifth time slice resources yielded by the first CA.

19. The terminal device of claim 17, wherein an execution status of the first CA is a working state when the first TA uses the second time slice resources yielded by the first CA, and wherein the execution status of the first CA is an idle state after the first CA releases the fourth time slice resources.

20. A non-transitory computer-readable storage medium storing instructions that are executable by a processor of a terminal device, wherein the terminal device comprises a first virtual machine, a second virtual machine, and a hypervisor, wherein the first virtual machine comprises at least one physical processor core, a rich execution environment (REE) is run in the first virtual machine, a first trusted execution environment (TEE) is run in the second virtual machine, an REE operating system (OS) and a plurality of client applications (CAs) are run in the REE, and a first TEE OS and a plurality of trust applications (TAs) are run in the first TEE, wherein the plurality of CAs comprises a first CA, wherein the plurality of TAs comprises a first TA corresponding to the first CA, wherein the hypervisor comprises at least one communication channel, each communication channel corresponding to one virtual processor core in the second virtual machine, wherein the at least one communication channel comprises a first communication channel, and wherein the instructions, when executed by the processor, cause the terminal device to be configured to:

receive, by the REE OS, a first operation for starting the first CA;

allocate, by the REE OS, first time slice resources of a first physical processor core to the first CA in response to the first operation;

occupy, by the first CA after starting, the first time slice resources, and generate, by the first CA, a first service processing request for calling the first TA to execute service processing;

send, by the first CA, the first service processing request to the hypervisor through the first communication channel;

receive, by the hypervisor, the first service processing request from the first CA, and map and schedule, to the first physical processor core, a first virtual processor core in the second virtual machine corresponding to the first communication channel;

send, by the hypervisor, the first service processing request to the first TEE OS;

bind, by the first TEE OS after starting on the first virtual processor core according to the first service processing request, the first TA corresponding to the first CA with the first virtual processor core;

yield, by the first CA, second time slice resources in the first time slice resources to the first TA through the hypervisor, wherein the second time slice resources are currently remaining time slice resources in the first time slice resources; and execute, by the first TA by using some or all of the second time slice resources yielded by the first CA, a first service requested in the first service processing request.

* * * * *